US008805925B2

(12) United States Patent
Price et al.

(10) Patent No.: US 8,805,925 B2
(45) Date of Patent: Aug. 12, 2014

(54) METHOD AND APPARATUS FOR MAINTAINING HIGH DATA INTEGRITY AND FOR PROVIDING A SECURE AUDIT FOR FRAUD PREVENTION AND DETECTION

(75) Inventors: Michael Price, Menlo Park, CA (US); Scott Degraffenreid, Desoto, TX (US); Joseph Dito, Burlingame, CA (US); Taylor Price, Menlo Park, CA (US)

(73) Assignee: Nbrella, Inc., Belmont, CA (US)

( * ) Notice: Subject to any disclaimer, the term of this patent is extended or adjusted under 35 U.S.C. 154(b) by 384 days.

(21) Appl. No.: 12/950,454

(22) Filed: Nov. 19, 2010

(65) Prior Publication Data

US 2011/0125648 A1 May 26, 2011

Related U.S. Application Data

(60) Provisional application No. 61/263,221, filed on Nov. 20, 2009.

(51) Int. Cl.
*G06F 15/16* (2006.01)

(52) U.S. Cl.
USPC .................................... 709/203; 707/999.001

(58) Field of Classification Search
USPC ................... 709/201, 219, 203; 707/999.001
See application file for complete search history.

(56) References Cited

U.S. PATENT DOCUMENTS

| 5,210,687 | A | 5/1993 | Wolfberg et al. | |
|---|---|---|---|---|
| 5,982,890 | A | 11/1999 | Akatsu | |
| 7,127,477 | B2 * | 10/2006 | Duncombe et al. | 709/238 |
| 7,197,537 | B2 * | 3/2007 | Koch | 709/206 |
| 7,373,362 | B2 * | 5/2008 | Detweiler et al. | 1/1 |
| 7,519,596 | B2 * | 4/2009 | Iyer et al. | 1/1 |
| 7,584,477 | B2 * | 9/2009 | Wu | 719/310 |
| 7,623,515 | B2 * | 11/2009 | Breuer et al. | 370/389 |
| 7,631,045 | B2 * | 12/2009 | Boerries et al. | 709/206 |
| 7,634,514 | B2 * | 12/2009 | Langan et al. | 1/1 |
| 7,680,830 | B1 * | 3/2010 | Ohr et al. | 707/999.2 |
| 7,735,000 | B2 * | 6/2010 | Vu et al. | 715/234 |
| 7,743,019 | B2 * | 6/2010 | Shah et al. | 707/610 |
| 7,783,993 | B2 * | 8/2010 | Welingkar | 715/864 |
| 7,805,422 | B2 * | 9/2010 | Fang et al. | 707/702 |
| 7,849,199 | B2 * | 12/2010 | Schulz et al. | 709/228 |

(Continued)

OTHER PUBLICATIONS

KS Labs. Compare Suite Press Release, Nov. 24, 2003.*

(Continued)

*Primary Examiner* — Evens J Augustin
(74) *Attorney, Agent, or Firm* — Michael A. Glenn; Perkins Coie LLP

(57) ABSTRACT

Any of various comparisons of computer folders from different points in time is performed. Such comparisons provide the ability to discover missing documents or documents with modification dates that have changed when there would otherwise have been no need to change them and thus allows discovery of missing documents to discover fraud or to search for evidence after a fraud is suspected. In another embodiment, deltas in accounting system vendor invoice accounts are compared at different points in time, potentially exposing the practice of moving fraudulent vendor transactions into a large group of legitimate transactions for a legitimate vendor. Per period transaction totals for specific periods for legitimate vendors are compared over historical time for suspicious activity. A comparison of reports from the two different periods, using exact data and software from those separate periods (instead of reporting from "current"' data), may raise a red flag otherwise missed.

23 Claims, 12 Drawing Sheets

(56) References Cited

U.S. PATENT DOCUMENTS

| | | | |
|---|---|---|---|
| 7,886,049 B2* | 2/2011 | Adelstein et al. | 709/224 |
| 7,895,156 B2* | 2/2011 | Bracha et al. | 707/624 |
| 7,899,882 B2* | 3/2011 | Shannon et al. | 709/217 |
| 7,917,534 B2* | 3/2011 | Demiroski et al. | 707/790 |
| 7,925,790 B2* | 4/2011 | Xue et al. | 709/248 |
| 7,979,391 B2* | 7/2011 | Watanabe et al. | 707/620 |
| 8,024,290 B2* | 9/2011 | Yang et al. | 707/625 |
| 8,046,424 B2* | 10/2011 | Novik et al. | 709/216 |
| 8,065,680 B2* | 11/2011 | Parvathaneni et al. | 718/102 |
| 8,131,739 B2* | 3/2012 | Wu et al. | 707/758 |
| 8,166,101 B2* | 4/2012 | Shah | 709/203 |
| 8,238,696 B2* | 8/2012 | Dart et al. | 382/305 |
| 2001/0011265 A1 | 8/2001 | Cuan et al. | |
| 2002/0174180 A1* | 11/2002 | Brown et al. | 709/203 |
| 2003/0028790 A1 | 2/2003 | Bleumer et al. | |
| 2005/0131990 A1* | 6/2005 | Jewell | 709/201 |
| 2007/0100913 A1* | 5/2007 | Sumner et al. | 707/204 |
| 2007/0139231 A1* | 6/2007 | Wallia et al. | 341/50 |
| 2007/0204033 A1 | 8/2007 | Bookbinder | |
| 2007/0226170 A1 | 9/2007 | Sun | |
| 2008/0016569 A1 | 1/2008 | Hammer et al. | |
| 2008/0244034 A1 | 10/2008 | Shannon | |
| 2011/0063340 A1 | 3/2011 | Umezaki et al. | |
| 2011/0125648 A1* | 5/2011 | Price et al. | 705/50 |

OTHER PUBLICATIONS

KS Labs. Compare Suite Press Release Version History. Nov. 24, 2003.

Neuwirth, C. M. et al., "Flexible diff-ing in a collaborative writing system", Proceedings of the Fourth Conference on Computer-Supported Cooperative Work (CSCW '92);, Oct. 31-Nov. 4, 1992, pp. 147-154.

* cited by examiner

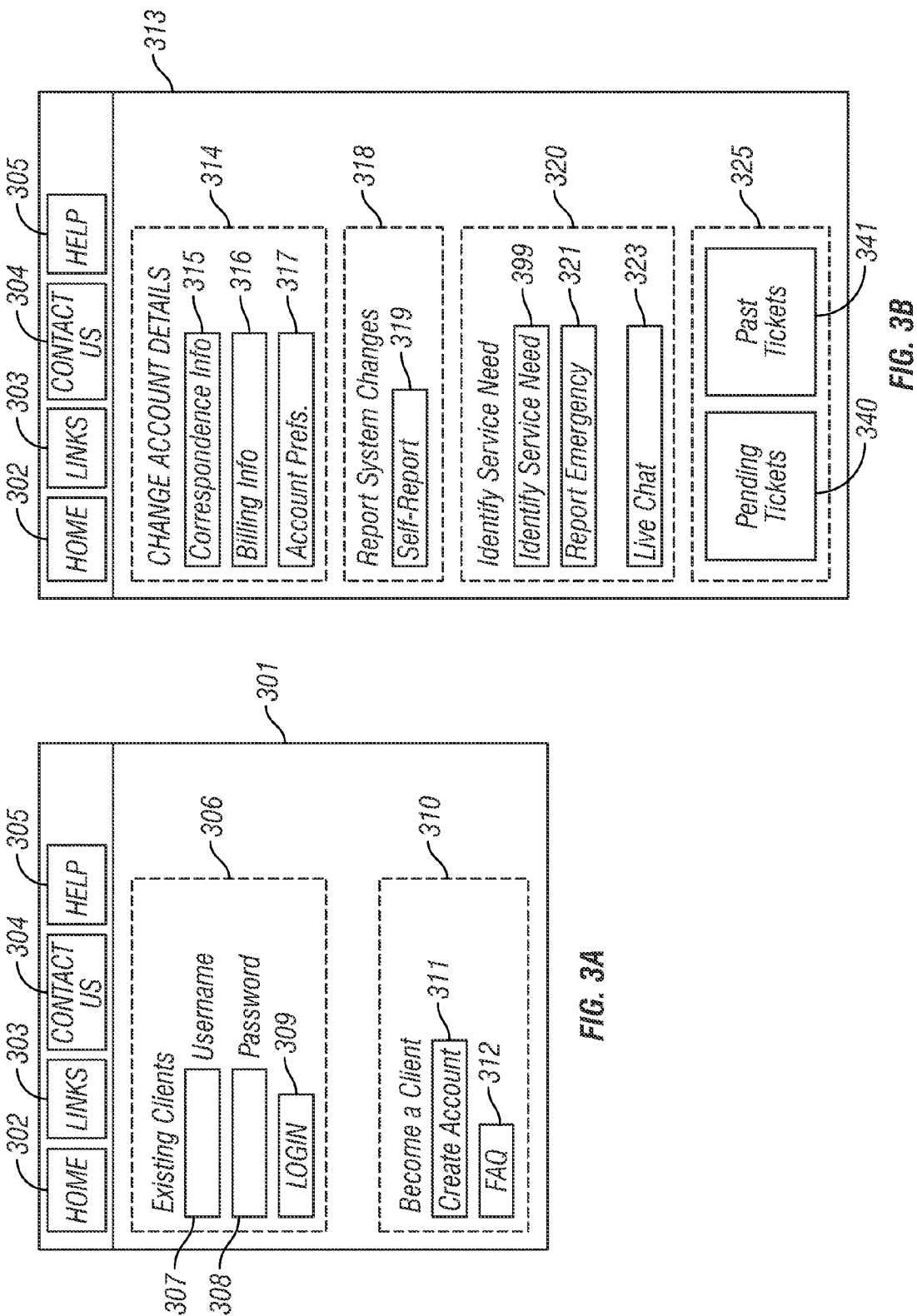

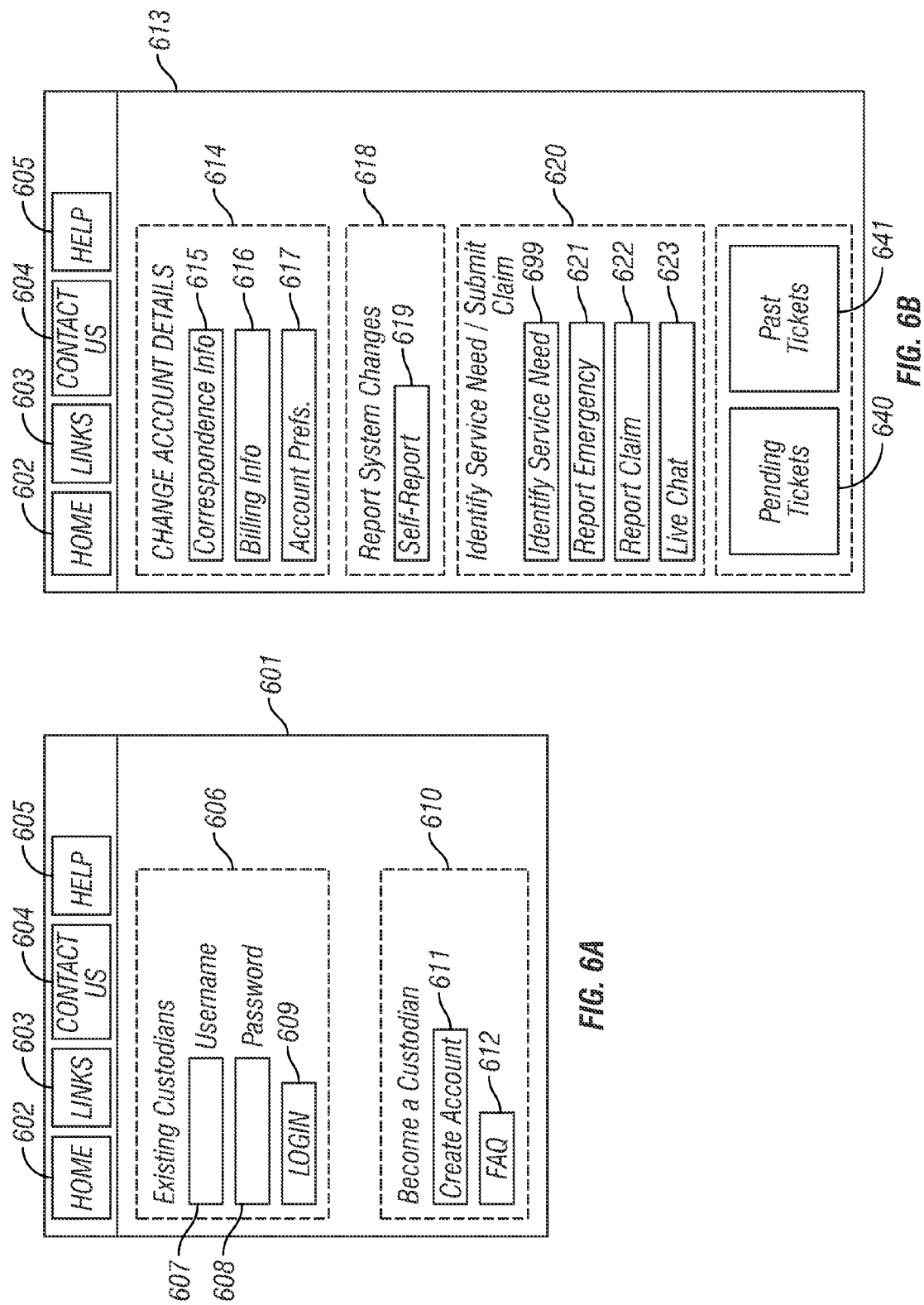

METHOD AND APPARATUS FOR MAINTAINING HIGH DATA INTEGRITY AND FOR PROVIDING A SECURE AUDIT FOR FRAUD PREVENTION AND DETECTION

CROSS REFERENCE TO RELATED APPLICATIONS

This application claims priority to U.S. provisional patent application Ser. No. 61/263,221, filed Nov. 20, 2009, which application is incorporated herein in its entirety by this reference thereto.

BACKGROUND OF THE INVENTION

1. Technical Field

The invention relates to fraud prevention and detection in information systems. More particularly, the invention relates to a method and apparatus for maintaining high data integrity and providing a secure audit for fraud prevention and detection.

2. Description of the Background Art

The Vulnerability of Digital Systems

Much internal organizational fraud is facilitated by the manipulation of digital data. Such data includes email, documents, spreadsheets, databases and, of course, accounting records. Changes of digital data over time, particularly deletions, are extremely difficult to discover or track. For example, a missing digital document or email may not be noticeable precisely because the object no longer exists. Something that does not exist, where a trail is not noticeable or nonexistent, is difficult or impossible to see.

Tampering with organizational information, while not necessarily classified as fraud, is often caused by modification of digital data. The collateral damage from tampering can be significant, even if tampering is ultimately not determined to exist. This damage may take the form of public relations nightmares, exposure to penalties, lawsuits, intellectual property damage, and poor decision-making based on inaccurate data.

Prior to the early 1980's, many organizations were less vulnerable to tampering and fraud than they are today. Why? Partly because of three things: unerasable ledger paper, sequentially numbered pages in ledgers, and indelible ink. These techniques, especially when used in combination, have been proven over hundreds of years to prevent fraud because it is difficult or impossible to modify the data. Even thousands of years ago, prior to the invention of paper, the ancient Egyptians used technologies, such as carved marks on stone tablets, to serve a similar purpose. Unerasable ledger paper, sequentially numbered pages, and indelible ink disappeared almost overnight in many organizations when digital computers were invented, and particularly, when micro-computers or so called personal computers were invented.

Digital systems now predominate for recording transactions, recording documents, sending and receiving written communication, and performing data analysis and accounting. Yet, digital systems have storage that is composed of modifiable and deletable bits and bytes of information, mostly stored in magnetic or other digital media formats which may be readily changed. The manipulation of digital data need not require the skills of a software programmer or computer genius. Many of the tools for ease of tampering are supplied by, surprisingly, software system manufacturers themselves.

It is of particular note that the most popular accounting system in current use for small businesses in America is called Quickbooks. Quickbooks' manufacturer, Intuit, also supplies a popular check register software package called Quicken. Yet, unlike unerasable paper ledger systems that preceded it, and indeed most digital accounting systems which preceded Quickbooks and Quicken, important data recorded into these software systems may be changed after it is recorded. Unlike traditional digital or paper ledger accounting systems, prior historical periods, such as months, are not closed in Quickbooks to prevent changes or tampering with historical information. The unerasable, unchangeable nature of accounting systems used to be a hallmark of the genre. Yet this staple feature of record keeping systems has been pilloried by the consumer-valued mantra of ease-of-use. When Quicken was introduced in the 1980's, accounting professionals were aghast at the lack of accounting control in this disruptive technology system. As Intuit's product line increased tremendously in market share to become the dominant product in its space, the accounting profession was forced to give in to this lack of control because the customers of accounting firms could not be dissuaded from purchasing the software program due to its ease of use combined with its low cost. Instead of fighting what looked like a losing battle, the accounting profession gave in. Because the average size company in the U.S. has approximately ten employees, and because a significant percentage of U.S. firms of that size use Quickbooks, the current digital accounting environment in the U.S. has become effectively an embezzler's dream come true. In a striking reversal of historical precedent, it seems to be more valuable today to have an accounting system that is easy to use and inexpensive than one that is secure against tampering and fraud.

The growth of the Internet has fueled the sharing of information among criminals and prospective criminals about how to commit fraud. Criminals have been known to organize on the Internet and teach each other how to perform acts of digital fraud. In a recent occurrence communicated to the inventors of the subject invention, a forensic accountant described a web site that took credit cards, charged their customers thousands of dollars, and taught them on-line classes in how to defraud their employers and not be caught. Knowledge about how to commit fraud has increased along with the growth in knowledge about how digital systems may be used and manipulated. In the early days of widespread computer use, there was a myth that computers were complex, accurate, and above manipulation. As knowledge about digital systems grows, more people are learning the fallacy of such thinking. Consequently, data of all sorts is less secure from tampering and fraud today than it was in many previous periods.

Scope of the Problem and Lack of Attention by Technology Service Providers

Internal fraud is fraud by employees where money or assets are taken for personal profit. How big of a problem is this? It's big. The Association of Certified Fraud Examiners, in their 2010 Report to the Nation, reports this as a $994 Billion annual problem. Worldwide, the ACFE reports this as a $2.9 Trillion problem. Further, the ACFE reports that the typical organization loses 5% of their annual revenue to fraud. That means that for organizations, eliminating fraud could significantly increase their profit or effectiveness.

External fraud is fraud by people outside an organization. These are so called cyber criminals, people such as hackers, virus writers, credit card thiefs, and the like. To stop these criminals, all sorts of technology is employed such as firewalls, anti-virus systems, anti-spyware, encryption, web filtering, patch management, unified threat management, and similar systems.

In the United States, private companies spend about $60 Billion annually on systems to prevent external fraud and small businesses spend approximately 10% of their entire information technology budget on crime prevention.

Yet, in sharp contrast, how much money is spent on technology systems for internal fraud prevention? Surprisingly, almost nothing is spent. This is the case even though the Computer Security Institute reported in their 2007 report, "12$^{th}$ Annual Computer Crime and Security Survey," that fraud overtook virus attacks as the source of the greatest financial losses reported by surveyed organizations. According to the Association of Certified Fraud Examiners in their "2010 Report to the Nations," the average U.S. fraud loss per incident is a whopping $160,000. Small businesses are especially vulnerable. The average loss for a U.S. small business with fewer than 100 employees is, per incident, $200,000.

Technology systems for detecting fraud do exist. For example, ACL Services Ltd. in Vancouver Canada provides data extraction and analysis software. Systems of this type are primarily detective in nature, not preventative. They operate by examining historical data and performing pattern analysis to look for anomalies indicating changes in behavior or processes which may be indicative of fraud.

Yet, prevention is often of greater value and practicality than detection because detection may help to solve a crime after its been committed. Prevention, in contrast, stops a crime before it ever happens, and often for less cost. Ask any cop what deters crime more, police presence on the street or unseen detectives back at the office? The answer you almost always get is "prevention." In the 1990's the New York City Police Department became the envy of the world when NYPD created a dramatic drop in crime in New York. How did they do it? It was stunningly simple. NYPD changed their focus from detection to prevention. They publicized the physical presence of police. If a potential criminal is tempted but knows he is being watched, guess what, he won't commit a crime. Simple. Likewise, detective focused technology service programs related to fraud are consequently not very effective at preventing fraud.

It is notable that the ACFE reports most organizational fraud incidents, i.e. 85%, are performed by first time offenders. Most internal fraudsters are not career criminals. Consequently, human behavior being what it is, prevention is likely to be especially effective against an individual with no prior history or experience of crime. Yet technology focused anti-fraud systems focused on prevention are extremely rare or nonexistent.

There is value to fraud prevention in other, perhaps unexpected areas, including saving human lives and preserving healthy families and a healthy society. It is an unfortunate fact that a significant number of fraudsters who are caught commit suicide. While the reasons for this are not entirely clear, some believe that it is due to the societal shame of being known as a fraudster. Others believe that it is because the typical fraudster, being a first time offender, does not think of himself as a criminal. Once he is caught, he is confronted with this fact and he perceives this as the opposite of his self-view, leading to an emotional implosion. There may be other motivations as well. For whatever reason, it is clear that the internal emotional pressure of being found out causes many fraudsters to end their lives. This has tremendous cost to the fraudster's family, his friends, his church, his social organizations, his co-workers in the organization that he defrauded, a tipster, and even the detective who discovered the fraud. One of the co-inventors of the invention knows an ex forensic accountant who left the profession because of the emotional anguish he felt over the death of fraudsters he identified. There would be human value and societal value if fraudsters were kept from temptation and prevented from committing fraud in the first place, rather than simply providing improved methods of detection to catch fraudsters so they may be given the opportunity to kill themselves.

The Need to Expand Fraud Detection

In May, 2005 the Gartner Research Group wrote a study entitled "Introducing the High-Performance Workplace: Improving Competitive Advantage and employee Impact." In this study they mention that 80% of enterprise content—such as e-mails, user documents, presentations, and Web material—is unstructured in nature. Yet, the Gartner Group points out that most internal audit testing focuses only on the remaining 20% of data that is structured, such as financial accounting systems or databases.

E-mail and Fraud

"Research indicates that E-mail communications can be a strong indicator of an employee's incentive/pressure, opportunity and rationalization—the three points of the Fraud Triangle."

Dan Torpey, CPA; Vince Walden, CFE, CPA; and Mike Sherrod CFE, CPA.

Torpey, Walden, and Sherrod point out in their Fraud Magazine article of July/August 2009, *Fraud Triangle Analytics—Applying Cressey's Theory to E-mail Communications*, that E-Mail is an under utilized data source in forensic investigations. Cressey's Theory was created by Dr. Donald Cressey, one of the co-founders of the Institute for Financial Crime Prevention. Dr. Cressey's theory attempts to explain why people commit fraud. His theory is that three components, opportunity, incentive/pressure, and rationalization are all present where fraud exists. This theory is referred to as Cressey's Fraud Triangle.

Torpey, Walden, and Sherrod tested Dr. Cressey's theory and reported their results in the Fraud Magazine article. First, they created three sets of key words people use in email conversation that might indicate if a person is experiencing each of the three components of Cressey's Fraud Triangle. The key word sets were created by an Ernst & Young fraud investigation team and an ACFE research team with assistance from the FBI and several unnamed Fortune 500 companies.

Second, they took two known fraud cases where there was an available E-mail trail during the period before the fraud took place, as well as during the period of fraudulent activity. The hypothesis considered by the authors was whether they could analyze the E-mail trail of individuals known to have committed fraud and see an increase in usage frequency of keywords from each of the three Fraud Triangle components during the period of alleged fraudulent activity.

Torpey, Walden, and Sherrod's results indicated a strong increase in the usage of words in all three keyword sets by fraudsters during the period of fraudulent activity. The usage of all three sets of words spiked compared with previous time periods. The authors conclude that this sort of E-mail key word analysis may be performed on organizational email systems and be predictive for fraudulent behavior or may reduce fraud risk. Using E-mail for fraud detection may become a valuable new tool in the quiver of fraud investigators and auditors.

Documents and Fraud

Missing or altered documents of many types may be indicators of fraud. Phony documents may be created and then deleted. Dishonest individuals may attempt to hide evidence of fraudulent activity by omitting certain documents from a folder or including outdated information. Similarly, corrupt individuals may attempt to hide inflated or other fraudulent pricing in a contract by either destroying existing documents or preventing the creation of documents during pre-solicitation activities. Consequently, auditors should be alert to situations where documents are incomplete or contain outdated documentation.

Joseph R. Dervaes, CFE, ACFE Fellow, CIA, mentions in a Fraud Magazine article of July/August 2009 entitled *Missing Disbursement Documents, Part* 1, that "missing disbursement documents are a red flag indicating disbursement fraud. But discovering them isn't as easy as it sounds."

It can be difficult to see if a document is missing simply because it is not there. Something that is missing is more difficult to notice than something that exists. Humans tend to trust what we see rather than look for things we don't see. Technology tools may be developed that help identify documents that are missing or have been altered. These sorts of tools would help auditors and fraud investigators uncover fraud. As more and more documents are digital in nature, such as PDF files and Word documents, digital tools should be an area of focus.

Unstructured data such as E-mails and documents are a fertile area for fraud investigation. Analysis of such data would expand the historical detective focus on accounting and database information. Consequently, it stands to reason that new investigative tools need to be developed and applied for use in these new areas.

Most importantly, preventative focused technology systems to prevent fraud and tampering are currently lacking in the marketplace yet would have tremendous value for organizations, societies, and governments. Digital systems and the technology industry created this mess. Digital systems and the technology industry should clean it up.

SUMMARY OF THE INVENTION

A presently preferred embodiment of the invention provides a technology system, service program, and methodology focused on fraud and tampering prevention. While the invention has detective elements, which add a measure of credibility, the principal focus is on prevention. Workplace integrity, employee integrity, integrity of record, and internal control are a few of the benefits to be realized by the invention.

Case Study: Missing Documents

" . . . the most common way fraudsters will try to conceal their misdeeds—missing documents."

Joseph R. Dervaes, CFE, CIA, ACFE Fellow, Vice chair of ACFE Foundation Board of Directors In the July/August 2009 issue of Fraud Magazine, Joseph R. Dervaes wrote an illuminating article entitled, *Missing Disbursement Documents*. His article notes that, "Fraud examiners can easily spot disbursement fraud by checking for falsified, missing, or destroyed documents." Mr. Dervaes goes on to state, "Typically, missing documents are a red flag indicating . . . fraud. But discovering them isn't as easy as it sounds."

Mr. Dervaes describes the case of a lead accountant at a small Air Force base who embezzled more than $2,000,000 over a period of three years. "He [embezzler] . . . routinely destroyed files, altered computer records, and forged initials of other office personnel on disbursement documents." Mr. Dervaes goes on to describe that the embezzler "feared discovery of his unauthorized actions, so he tried to conceal the fictitious transactions in the accounting system by transferring them from the false vendor account to other legitimate vendor accounts in the organization's computer records."

A Presently Preferred Embodiment of the Invention

A presently preferred embodiment of the invention addresses the above mentioned issues concerning fraud by providing what is referred to herein as Indelible Synch™ technology, which technology could have prevented this embezzlement for a small fraction of the cost of the loss involved.

The herein disclosed invention makes it relatively easy to discover missing or altered digital documents or any other altered digital data. As an added bonus, the herein disclosed invention could have been used to detect the altered accounting records in this case study.

Further, the herein disclosed invention could have lowered the indirect costs and eased the effort and time involved in the post-fraud, detective, investigative process. With many frauds, the indirect downstream expenses of investigation, legal fees, lost productivity, and even risk of going out of business can be more expensive than the fraud loss itself. Tools, such as those provided by the herein disclosed invention, ease the burden of investigation and analysis and are therefore of value.

The herein disclosed invention service program could have saved this small Air Force base millions of dollars. Here's how:

Prevention in the First Place

If the potential embezzler knew there was an untouchable digital recording system in place with encrypted data stored in multiple geographical locations and accessible by auditors, a system which would easily allow for the discovery of manipulated digital data, it is likely he would not have embezzled or would have decided to ply his "trade" elsewhere for an organization without the coverage provided by the invention. An embezzler may make more money via embezzlement than from his salary, so changing jobs for a more "embezzlement hospitable environment" would be a no brainer. Prevention is the best way to fight crime because it is effective, predictable, and low cost Discovery of Missing Documents Made Simple Indelible Synch™ technology allows the comparison of digital data, such as computer folders, from different points in time. The number of documents in folders may be compared: The last date and time of modification may be compared, not to mention the contents of the document itself. Any of these comparisons present a strong ability to discover missing documents or documents with modification dates that have changed when there would otherwise have been no need to change them. The invention implemented service program and tools greatly ease the challenge of discovering missing documents. The herein disclosed invention may have been used as a tool to discover the fraud in the first place or search for evidence after a fraud was suspected.

Accounting System Analysis Made Comprehensible

Indelible Synch™ technology allows deltas in the accounting system vendor invoice accounts to be compared at different points in time, potentially exposing the practice of moving fraudulent vendor transactions into a large group of legitimate transactions for a legitimate vendor. Per period transaction totals for specific periods for legitimate vendors are compared over historical time for suspicious activity. For example, in April of 2008 a ledger for vendor ABC Company may show $200,000 in payments for the first quarter of 2008. By the time December of 2009 comes around, that same vendor may show $250,000 in payments for the first quarter of 2008. A comparison of reports from the two different periods, using exact data and software from those separate periods, instead of reporting from "current'" data, may raise a red flag that would otherwise be missed. The invention implemented service program and tools greatly ease the challenge of comparing accounting data and other types of data across periods of time.

Result for the would-be Fraudster

Given the fact that few organizations today have any type of employee visible anti-fraud systems in place, the prospective fraudster in an organization covered by the invention is likely to either:

a) not be tempted to commit fraud in the first place; or
b) exit their organization and ply their trade down the street where the pickings would be far easier.

Criminals are opportunistic as are all humans. The easiest path is often chosen.

Related Utility of the Invention

The invention has utility in areas such as intellectual property (IP) development time stamping such as support for concept invention, support for legal matters such as discovery in defense of a lawsuit, support for compliance oversight, historical analysis, or other needs that could be satisfied via a secure and reliable source of historically accurate data and software applications that may be legitimately claimed to be indelible and include a secure custody component. For example, many organizations today are concerned about intellectual property development. These organizations know they may not be able to rely on backup tapes and similar near-term focused backup policy and procedure. Very often, systems such as this are not secure from employee or third party tampering. These organizations are unable to rely on their employees either to know when something has been invented or indeed to write it down and record it as such even if they did know. It's not unusual for a manager to instruct employees to record "ah-hah" moments in special locations and it's not unusual for an employee not to do so. Encrypted snapshots of data stored in an indelible fashion could be used by organizations in IP filings and in court to prove origin of an invention.

BRIEF DESCRIPTION OF THE DRAWINGS

FIGS. 3A-3C are a series of screen shots that illustrate a user interface for a technique for maintaining high data integrity and for providing a secure audit for fraud prevention and detection according to the invention;

FIGS. 6A-6C are a series of screen shots that illustrate custodial accounts and user interaction therewith according to the invention;

DETAILED DESCRIPTION OF THE INVENTION

Figure 1A:
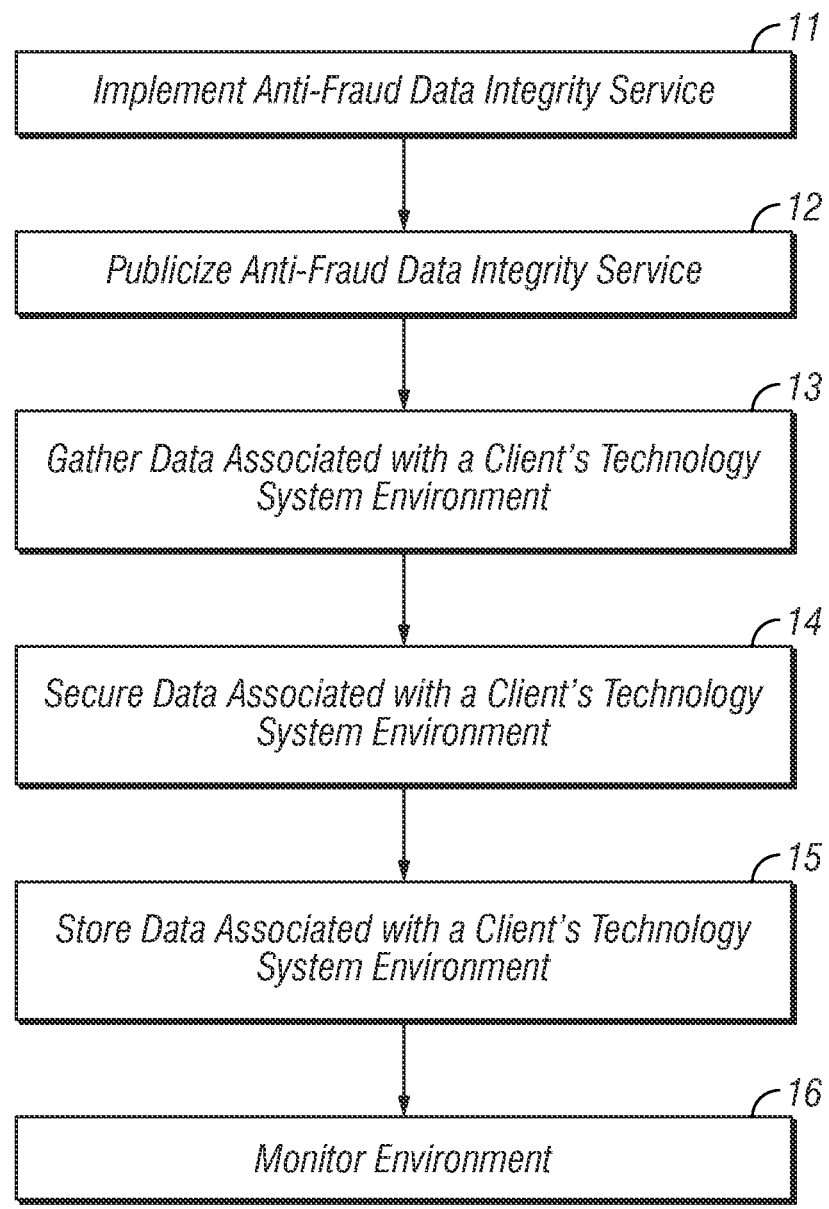
FIGS. 1A-1C are a series of flow diagrams that illustrate a technique for maintaining high data integrity and for providing a secure audit for fraud prevention and detection according to the invention.

An embodiment of the invention comprises a unique system, method, and service program using technology and systems and methods that are focused on fraud prevention and data tampering prevention for organizational entities. There are fraud detection service programs on the market, but nothing that is prevention focused as the core offering. The principal methods of fraud detection offered as a service program in the marketplace are detective focused, not prevention focused. Many of them tend to be focused on pattern recognition analysis of data that looks for abnormal patterns that might constitute fraudulent behavior. This is generally focused on the narrow area of accounting systems. In contrast, the herein disclosed invention focuses on all digital data and, while the invention may be used for detection, a principal aspect of its value and focus is on prevention. Prevention is thought to be superior to detection as a way to prevent crime.

Related to this embodiment of the invention is data tampering. This is a grey area about whether it is fraud on one end of the spectrum or so-called "creative accounting" or "optimism" on the other. While data tampering may not constitute a crime, it can cause a manager or board member to make an incorrect business strategy decision, with expensive or catastrophic results. Consequently, an embodiment of the invention prevents both fraud, i.e. criminal activity, and data tampering, i.e. not necessarily criminal activity.

The invention allows employees to be trusted and do their jobs. For example, a good employee does not want any other employee to perform the digital equal of leaving the loading dock door open. The ACFE reports in their 2010 "Report to the Nation" that, by far and away, the #1 reason fraudsters are caught today is because of a tip from another employee, not because of detective systems, audits, or any other reason. Why is this so? It is because employees do not want the fraud going on at their organization. It's unfair. It hurts them. It is a fact that honest cops like recording dash cams in their patrol cars because the video recording systems protect them. Thus, the invention contributes to an honest and level playing field type workplace by honoring the honesty of employees while helping keep them honest.

New research in 2009 and 2010 at the Kellogg School of Management at NorthWestern University, one of the most respected business schools in the U.S., includes a study on temptation. The researchers identified something called "restraint bias." They discovered that most people exhibit restraint bias. Restraint bias is a person's belief that he can handle more temptation than he actually can. It turns out that most people often have difficulty appreciating the power of impulsive states of mind. Ironically, the study showed that those who are most confident about their self-control are the most likely to give into temptation. A conclusion reached by the researchers at the Kellogg School was that "a system which assumes people will control themselves is going to fall prey to this restraint bias." So what's the solution? The researchers said the solution to this common human challenge is quite simple. "The key is simply to avoid any situations where vices and other weaknesses thrive . . . " Recall that the ACFE reports in their 2010 Report to the Nation that 85% of fraudsters are first time offenders. Fraudsters are not career criminals. They are otherwise honest, trustworthy employees who find themselves tempted. Thus, the invention may deter an otherwise honest would-be fraudster by limiting his temptation.

The Architecture

A computer architecture created by an anti-fraud focused organization may be used as a component or components in the anti-fraud invention.

A presently preferred embodiment of the architecture consists of the following:

Product Focus:

Secured copy, secured transport, secured recovery of server based data files and secured recovery of server functionality itself.

Components:

A client on-site "hardware server appliance." This hardware server appliance makes digital copies or "snapshots" of digital data on the client's production server systems. This digital data is resolved in a digital bit stream delta type, in the interests of economy and feasibility, though file-by-file or image backup or other techniques are possible, and stored on hard drives or other digital media such as Random Access Memory storage within or attached to the hardware server appliance.

The data are stored in an encrypted format.

The data copies are made on a set time interval schedule that may be adjustable and may be set randomly, for example, every 15 minutes.

The hardware server appliance is capable of making copies or "snapshots" from one or more client production servers.

In the preferred embodiment, the encryption key is not held by the client, their employees, officers, board members, or any person or entity with a possible conflict of interest, but rather by a third party custodian.

The hardware server appliance may be used, by the third party custodian or under their control and oversight, to extract digital data in order to examine or audit data, run a comparison analysis, or reproduce a historical digital environment, including software systems and configurations in use on the client's servers at a historical moment.

The data on the hardware server appliance may be copied, synchronized, replicated, cloned or mirrored at one or more off site locations. These locations may be secure data centers or other locations, such as other site locations controlled by the client or at locations controlled by third party service providers or the third party custodian.

One hardware server appliance at one location may be securely mirrored, copied, or cloned to another hardware server appliance at another location via a public data network such as the Internet or a private network.

The mirrored, copied, synchronized, replicated, or cloned hardware server appliance may be used, by the third party custodian or under their control and oversight, to extract digital data in order to examine or audit data, run a comparison analysis, or reproduce a historical digital environment, including software systems and configurations in use on the client's servers at a historical moment. For example, this may take the form of an auditor, forensic accounting, government, court, compliance, or supplier supervised laboratory type environment.

The hardware server appliance, whether located on the client premises or a hardware server appliance located at any off site location, and including copied, synchronized, cloned or mirrored data from the client premises hardware server appliance, may be used to reproduce one or more client production servers via server virtualization.

A hardware server appliance may be physically moved from a client premises location to any other location and may be utilized to extract digital data in order to examine or audit data, run a comparison analysis, or reproduce a historical digital environment, including software systems and configurations in use on the client's servers at a historical moment.

As an option, data related to the subject invention stored on hardware server appliances or at data centers may be copied or "dumped" to data storage media and these media may be delivered to another location for additional offsite storage, for example, a safe deposit box.

The system's functionality, operations, and general system server health and status are monitored 24×7 by a data center. Monitoring reports and alerts can be sent to a service organization or service team who services the system.

The purpose of the high data integrity system of subject invention may be publicized in manners designed to increase it's effectiveness of purpose. For example, when used as an organizational fraud or tampering prevention system, the presence of the fraud or tampering prevention system may be publicized to employees, officers, board members, stakeholders, third parties and the public. If employees of the organization or other users who use the production server resources of the organization know the production servers are being monitored, employees and other users are motivated, via human nature, to avoid fraudulent or tampering activities. Very few people will drive over the speed limit when they know a policeman is watching.

As another example, when used as an intellectual property development recording system, publication of it's presence has utility for organizational employees, officers, board members, investors, stockholders, and others including the public at large. An invention timeline may be proved which otherwise may not be provable, increasing organizational value and effectiveness. An invention otherwise not noticed as an invention by those who invented it, such as a life enhancing drug discovery, may be discovered by employees or agents representing the organization via data extraction and analysis from different historical time periods. When a system such as this is publicized effectively, humans are motivated, via human nature, to consider using the system for gain.

The presence of a hardware server appliance may be effectively publicized with a variety of methods including, color of the hardware components, the preferred embodiment is red;
a flashing light;
a posting or tag in a language;
a periodic or random sound;
a camera;
a microphone;
a lock;
tamper proof screws;
a tampering actuated ink sprayer;
an aroma distributor;
an anti-movement monitor.

The presence of service programs and methods related to the present invention may be effectively publicized with a variety of methods including, public meetings;
written description highlighted in an employee manual;
check list item for mandatory new employee information transfer;
text messages, logos or splash screens displayed periodically on computer monitors of employees within monitored client organizations.

Figure 1B:
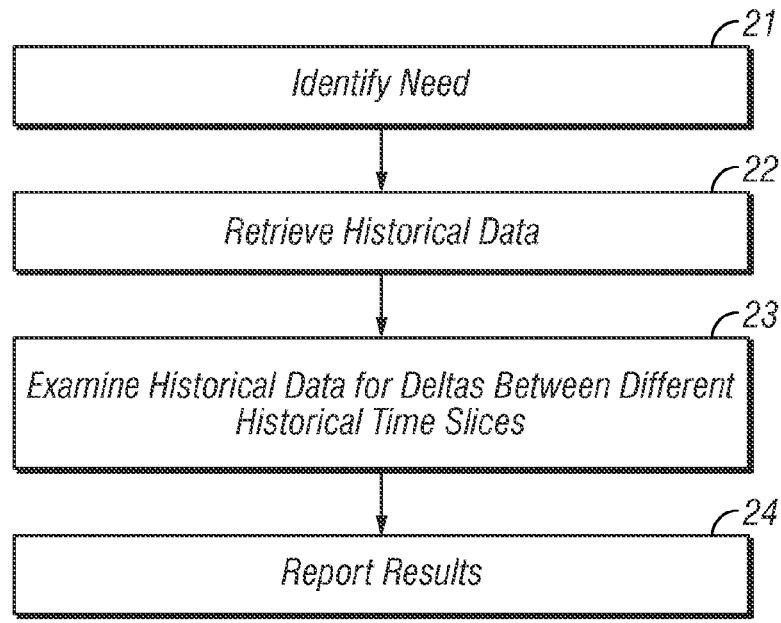
Figure 1C:
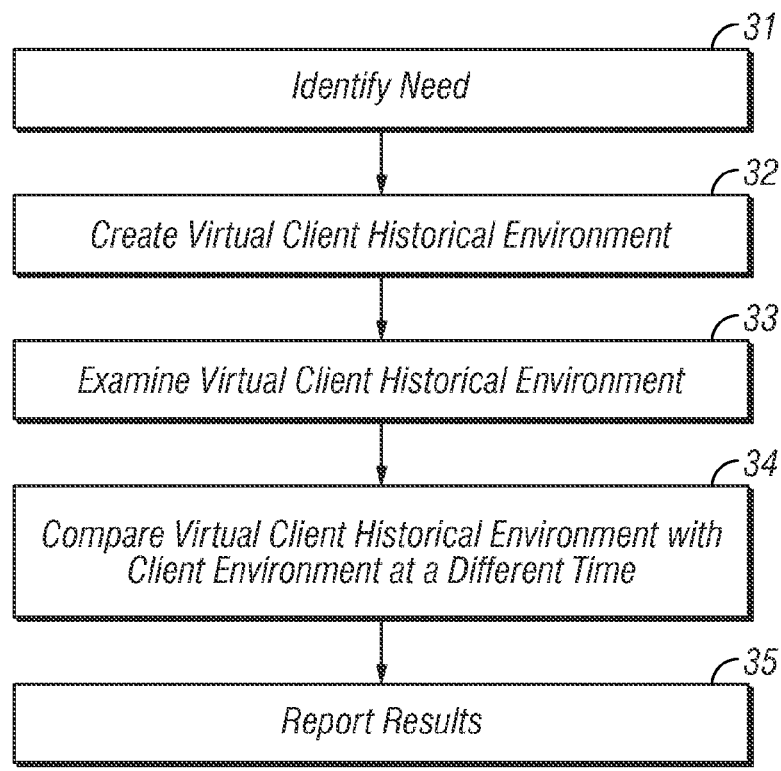

FIGS. 1A-1C are a series of flow diagrams that illustrate a technique for maintaining high data integrity and for providing a secure audit for fraud prevention and detection according to the invention.

In FIG. 1A, an anti-fraud data integrity service is implemented 11. A key aspect of the invention, i.e. prevention, is effected by publicizing the anti-fraud integrity service 12. Data associated with a client's technology system environment is gathered 13, and the data associated with the client's technology system environment is secured 14 and stored 15. The environment is then monitored 16.

In FIG. 1B, a need to determine if fraud has occurred is identified 21. The historical data stored in the steps of FIG. 1a is retrieved 22 and examined for deltas (changes) between different historical time slices 23. The results of such examination are then reported 24.

In FIG. 1C, a need to determine if fraud has occurred is identified 31. A virtual client historical environment is created 32 and examined 33. The virtual client historical environment is compared with the client environment at different times 34 and the results of such examination are then reported 35.

FIGS. 2A-2D are a series of block schematic diagrams that illustrate a device for maintaining high data integrity and for providing a secure audit for fraud prevention and detection according to the invention.

Figure 2A:
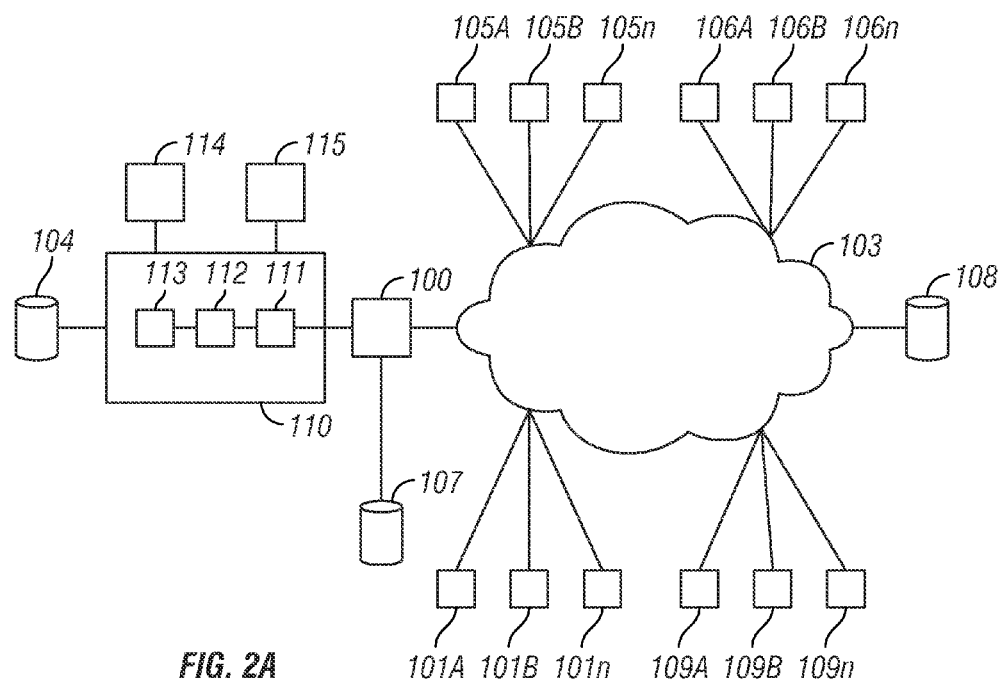
FIGS. 2A-2D are a series of block schematic diagrams that illustrate a device for maintaining high data integrity and for providing a secure audit for fraud prevention and detection according to the invention.

In FIG. 2A, a network 103 is shown that provides a medium of information exchange for a plurality of data service centers 101A, 101B, 101n, a plurality of client environments 105A, 105B, 105n, a plurality of service providers 106A, 106B, 106n, a plurality of forensics analysis systems 109A, 109B, 109n, a network database 108, and a fraud prevention and detection server 100. The server 100 comprises a database 107 and a server-based management processing engine 110 which, in turn, comprises a database 104, and interface 114, and input device 115 and, internally in this embodiment, a memory 113, processor 112, and network interface 11.

Current products provide a cloned backup system at another location. However, the purpose of such system is for disaster recovery, not fraud forensics analysis. When used for disaster recovery (existing model), the remote cloned backup system is used to recover/replace the entire original production server if the client site where the production server and on-site backup system is located burns down, the gear is stolen, etc. For fraud analysis, the remote site cloned backup system is used to create a virtual historical environment for purposes of detective analysis and not to replace the live client production server.

Figure 2B:
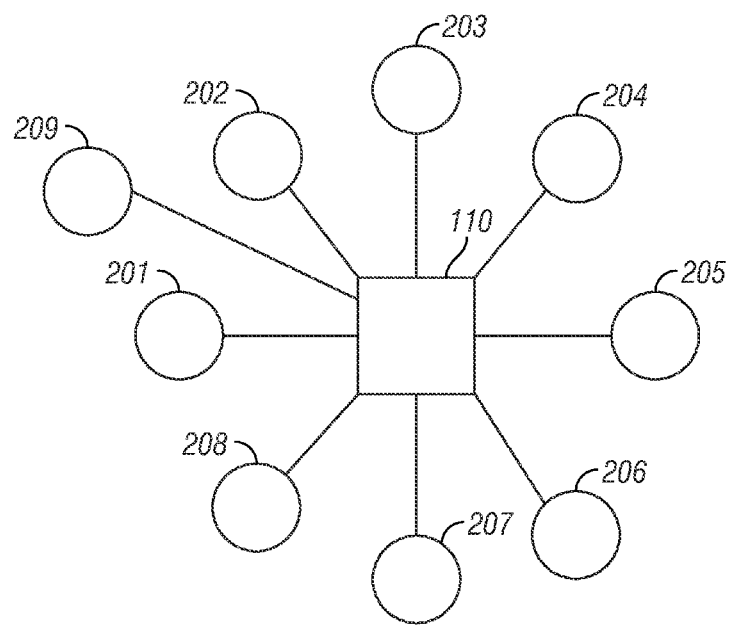

In FIG. 2B, the server-based processing engine 110 includes an administration module 201, a client account module 202, a client environment determination module 203, an automated data collection module 204, a client fee calculation module 205, a service deployment module 206, a control module 207, and an auxiliary module 208.

These modules are programmed to handle the process of fraud prevention and detection and other integrity of record functionality, not necessarily backup/restore/disaster recovery. However, the fraud system could also be used for backup/restore/disaster recovery in some embodiments.

The administration module 201 serves to manage, unify, and report on all modules of the server processing engine 110. The administration module 201 additionally serves to coordinate management activities related to status, monitoring, and maintenance, and reporting of client environments, service providers, data service and storage centers, databases, forensics analysis systems, client onsite hardware server appliances, and fraud prevention and detection servers. Additionally, the administration module 201 serves to provide service contract management services, client and custodial billing services, and transaction monitoring, reporting, and maintenance services.

The client account module 202 performs, manages, and coordinates client account creation, setup, modification, status, account maintenance, and module reporting, The client environment determination module 203 serves to provide support and query capability to determine the suitability and compatibility of technology systems and service programs related to the current invention. This environment determination includes an analysis of client data size and data capacity in order to match appropriate service programs to the client's need and desire for coverage. As client environments are continually in flux, the client environment determination module 203 additionally monitors changes to the client environment over time which might render an existing service program non feasible without service program modifications, including termination of service. For example, a client's newly discovered need for data storage, based on client environment data growth, may necessitate service program modification of some sort.

The automated data collection module 204 collects data on client environments, client systems, forensic analysis systems, data service centers, and service providers in order to provide information support for module 205, the client fee calculation module.

The client fee calculation module 205 takes data gathered by the client account module 202, the environment determination module 203, and the automated data collection module 204, and uses this information to calculate client fees for service related to the invention. Calculated fees are transferred to the administration module 201 for contract management and billing purposes.

The service deployment module 206 manages service requests and coordinates service delivery. Service requests may be received from automated monitoring systems, clients, custodians, or third parties such as CPAs, forensic accountants, auditors, lawyers, courts, governments, militaries, intelligence services, or others. For example, a client may request that data collected by a forensics analysis system may be utilized on a periodic schedule such as quarterly by a qualified and authorized Forensic Accountant in order to perform check-listed activities, the results of which will be reported to an authorized party. Service requests may be in writing, E-mail, court order, via the Internet, FAX, voice call, chat, tweet, or other like methods. Given the privacy and security aspects inherently involved when it comes to private organizational data, the authorization, coordination, and delivery of information related to this data obviously need be tightly coordinated and controlled to comply with law and confidentiality. Service delivery is handled by representatives of organizations who own the rights to or license the present invention, as well as authorized third parties.

The control module 207 provides monitoring and control functionality related to the invention. The control module 207 provides for human, robotic, and technology system monitoring related to status, errors, maintenance, client environments, service providers, data service and storage centers, databases, forensics analysis systems, client onsite hardware server appliances, and fraud prevention and detection servers. The control module 207 may further be used to maintain systems related to the current invention, such as to update patches and software. The control module 207 may further be used to perform actions related to the above monitoring and maintenance activity. For example, the determination of client data storage at a data center which exceeds a preset limit may trigger a communication between the control module 207 and the client fee calculation module 205 so fees or contracts may be adjusted.

An auxiliary module 208 provides improved functionality and benefits according to the present invention by allowing interfaces to other networks and systems, services related to areas other than fraud and tampering prevention and detection such as intellectual property development time stamping and concept invention support, support for legal matters, compliance oversight, historical analysis, and other needs that could be satisfied via a secure and reliable source of historically accurate data. Access to data and reporting must adhere to the strictest and highest level of standards possible and be enforced by the service deployment module 206.

The custodian account module 209 performs, manages, and coordinates custodian account creation, setup, modification, status, account maintenance, and module reporting. In addition, the custodian account communicates with the service deployment module 206 in the coordination of service requests and with the auxiliary module 208.

Figure 2C:
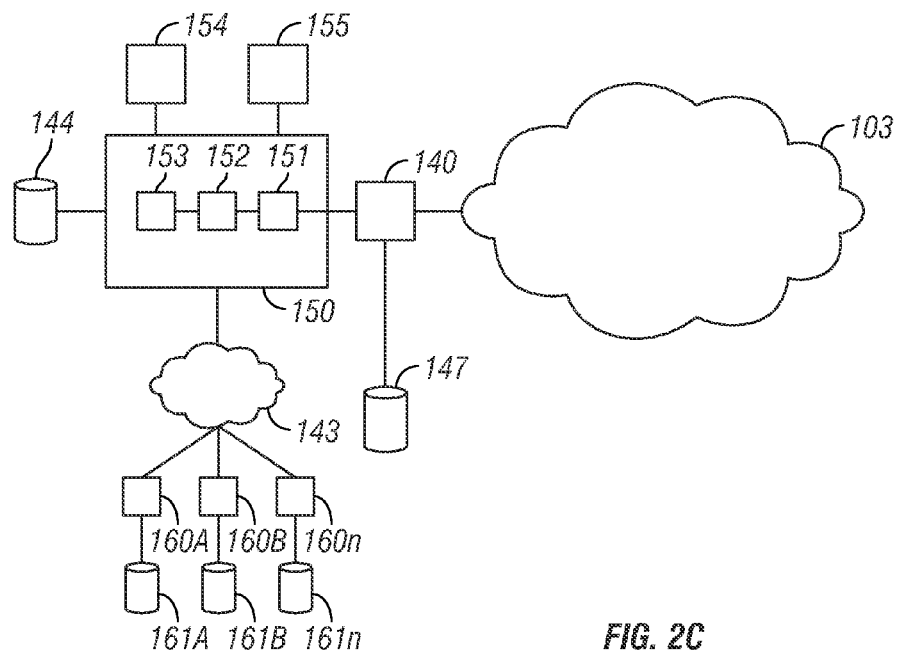

In FIG. 2C, a high data integrity server 140 is shown. The server 140 comprises a database 147, and a server-based data copy engine 150 is shown that includes database 144, an interface 154, and an input device 155 and, internally in this embodiment, a memory 153, a processor 152, and a network interface 151. An enterprise or other network 143 is connected to a plurality of client processing systems 160A, 160B, 160n, each of which is, in turn, connected to a corresponding database 161A, 161B, 161n. The embodiment of FIG. 2C shows how a system makes copies of the data on one or more servers at a client site location in support of the invention.

Figure 2D:
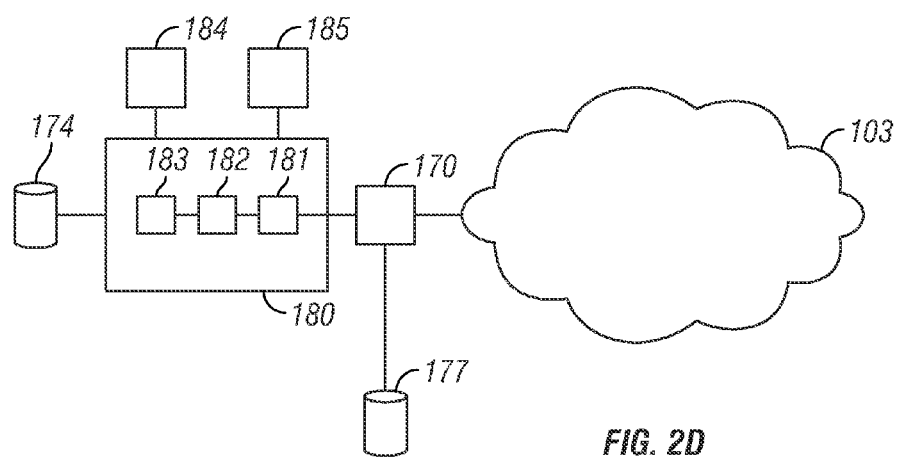

In FIG. 2D, the forensics analysis system, e.g. 109A, 109B, 109n (FIG. 2A) is shown comprising a server 170 having a database 177 and further comprising a server-based data copy processing engine 180 that comprises a database 174, interface 184, and input device 185 and, internally in this embodiment, a processor 182, memory 183, and network interface 181.

Figure 3C:
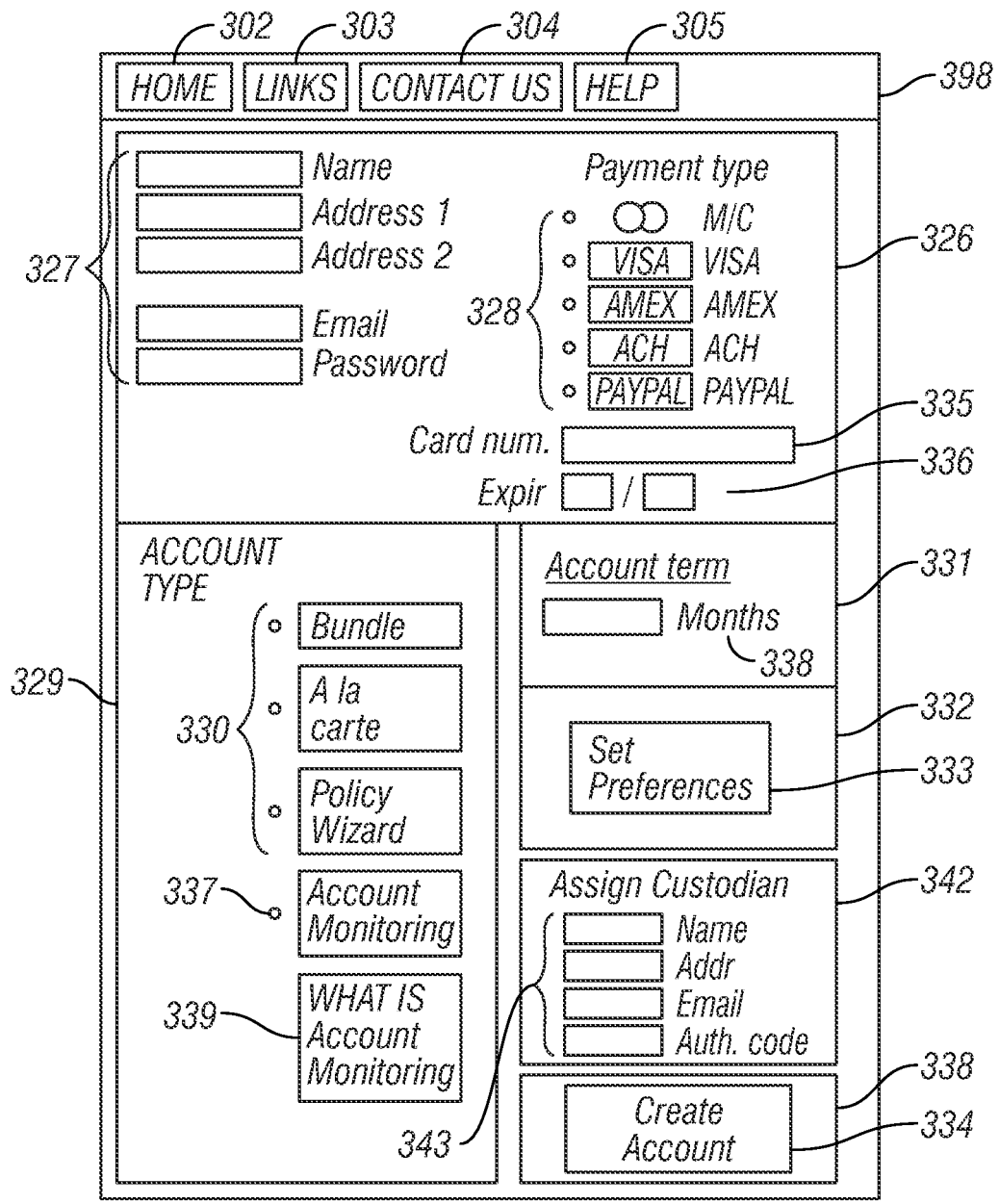

FIGS. 3A-3C are a series of screen shots that illustrate a user interface for a technique for maintaining high data integrity and for providing a secure audit for fraud prevention and detection according to the invention.

In FIG. 3A, tabs are shown for Home 302, Links 303, Contact Us 304, and Help 305, as with many home pages for conventional web sites. An Existing Client pane 306 is shown that includes a filed for entry of a User Name 307 and Password 308 pursuant to operation by a user of a Login button 309; and a Become a Client pane 310 is shown that includes a Create Account button 311 and a FAQ button 312.

In FIG. 3B, a user pane 313 is shown that includes a Change Account Details pane 314, which consists of fields for Correspondence Info 315, Billing Info 316, and Account Prefs 317. A Report System Changes pane 318 includes a Self Report field 319; an Identify Service Need pane 320 includes an Identify Service Need field 399, a Report Emergency field 321, and a Live Chat field 323; and a ticket pane 325 includes a Pending Tickets field 340 and a Past Tickets field 341.

In FIG. 3C, a payment pane 326 includes user contact fields 327, a Payment Type field 328, a Card Num. field 335 for credit card numbers, and a Expir. Field 336 for a credit card expiration date. An account type pane 329 includes account type buttons 330, an Account Monitoring button 337, and a What Is Account Monitoring button 339. Account monitoring is an optional service related to the invention which monitors the success of copying data, securing it, transporting it, storing it, and, optionally, reporting on third party custodian authorized access to it. Monitoring answers the question, "Is the system working and what's going on with it?" A client may choose to have monitoring enabled and may choose the types of monitoring desired and the method of reporting and notification regarding monitoring which best fits the client's need. An Account Term pane 331 includes a Months field 338 and a Set Preferences button 333. The Assign Custodian pane 342 includes fields for custodian information 343.

Due to the nature of the invention, it is important to protect the data and confidentiality of the client to the utmost extent possible, both within the client organization and outside it. There are legal, privacy, governmental, and law enforcement aspects of numerous natures involved here. This potential set of requirements is provided for by allowing the client to authorize a custodian to have access to the data collected and secured by the invention. Providing custodian access and protecting it in a highly secure way is of great utility. Furthermore, in some implementations of the invention, it provides substantially greater benefits if no one inside the client organization has any access to the data securely collected. For example, if no employee including the CEO or President of an organization has access, the invention provides a high fraud and tampering preventative benefit which would be lessened otherwise by injecting the issue of data credibility. Similarly, if the invention were used for collecting data for the purpose of legally proving the timeline of intellectual property development, the benefit would be far less compelling if any member of the client organization, officers, or investors had access to the secure client collected data. For these reasons and potentially more, the invention has been provided with a custodian feature to allow an authorized third party to have access to client organizational data for analysis and reporting purposes if and when the client chooses to grant this access. This custodian may be a CPA, Forensic Accountant, auditors, lawyer, court, law enforcement, government, military, intelligence service, or other.

Finally, there is a Create Account pane 338 that includes a Create Account button 334.

An important aspect of the invention is that of a custodian. A custodian is the keeper of the encryption key or the keeper of some or all of the copies of the data collected by the invention. When the invention is used for fraud or tampering prevention and detection, intellectual property development support, or other functions, it is generally important that the data not be accessible to any employee, officer, investor, etc. of any of the client organization's servers that are the subject of the system of the present invention. To provide such access to the client or their representatives would lessen or possibly even completely eliminate the effectiveness and value of the system. The custodian needs a special account, separate from the client account. The client must authorize the custodian, hence the addition of the custodian authorization code 342 (FIG. 3C) before the custodian may setup a custodial account, have access, and request analysis and monitoring services. While a custodian may be an employee of the client organization, in a preferred embodiment the custodian is a third party, such as an auditor, CPA, client, supplier, court appointed monitor, government, law enforcement, and the like.

Figure 4:
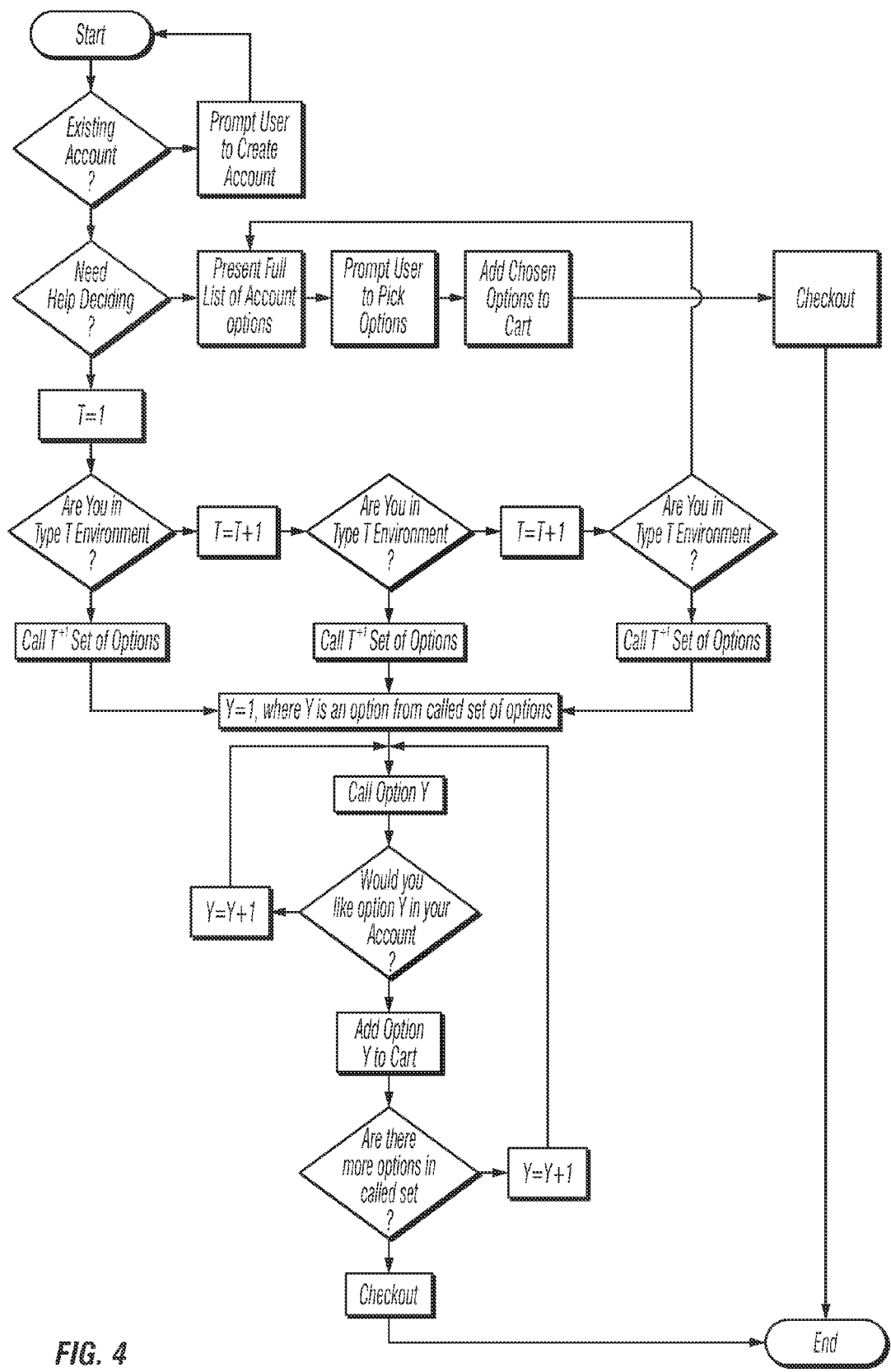
FIG. 4 is a flow diagram that illustrates user interaction with the user interface of FIGS. 3A-3C according to the invention.

FIG. 4 is a flow diagram that illustrates user interaction with the user interface of FIGS. 3A-3C according to the invention.

In FIG. 4, the flow starts (400) with a determination if there is an existing account (401). If not, the user is prompted to create an account (402). If there is an account, a determination is made if the user needs helps (403). If he does not need such help, then a list of account options is presented (404) and the user is prompted to make a selection (405), after which the chosen options are added to a user cart (406) and the user proceeds to checkout (407), after which the session is complete (425). If the user does need help deciding on an account type, for example based on a time out T=1 (408), then the user is asked if he is in a Type T environment (409). If the answer is "Yes," then the T set of options is called (414). User selection of an option (417) calls the selected option (418). If the user is asked if he is in a Type T environment and there is a time out T=T+1 (410), then the user is again asked if he is in a Type T environment (411) and, if the user answers "Yes," then the T set of options is called (415) and the process proceeds. If there is a further time out (412), the user is again asked if he is in a Type T environment (413) and the process responds to the user's entry of an answer by calling the T options set (416) or the process responds to a further time out by again presenting a list of options to the user (404).

When an option Y is selected, the option is called (418) and the user is asked if he would like option Y in his account (420). If the answer is "Yes," the option is added to the user's cart (421); if there is a time out Y=Y+1 (419) the option is called again. If the option is added to the user's cart, the user is asked if there are more options to be set (422). If there is a time out Y=Y+1 (423), then the option is called again (418); else, the user checks out (424) and the process is concluded (425).

Figure 5:
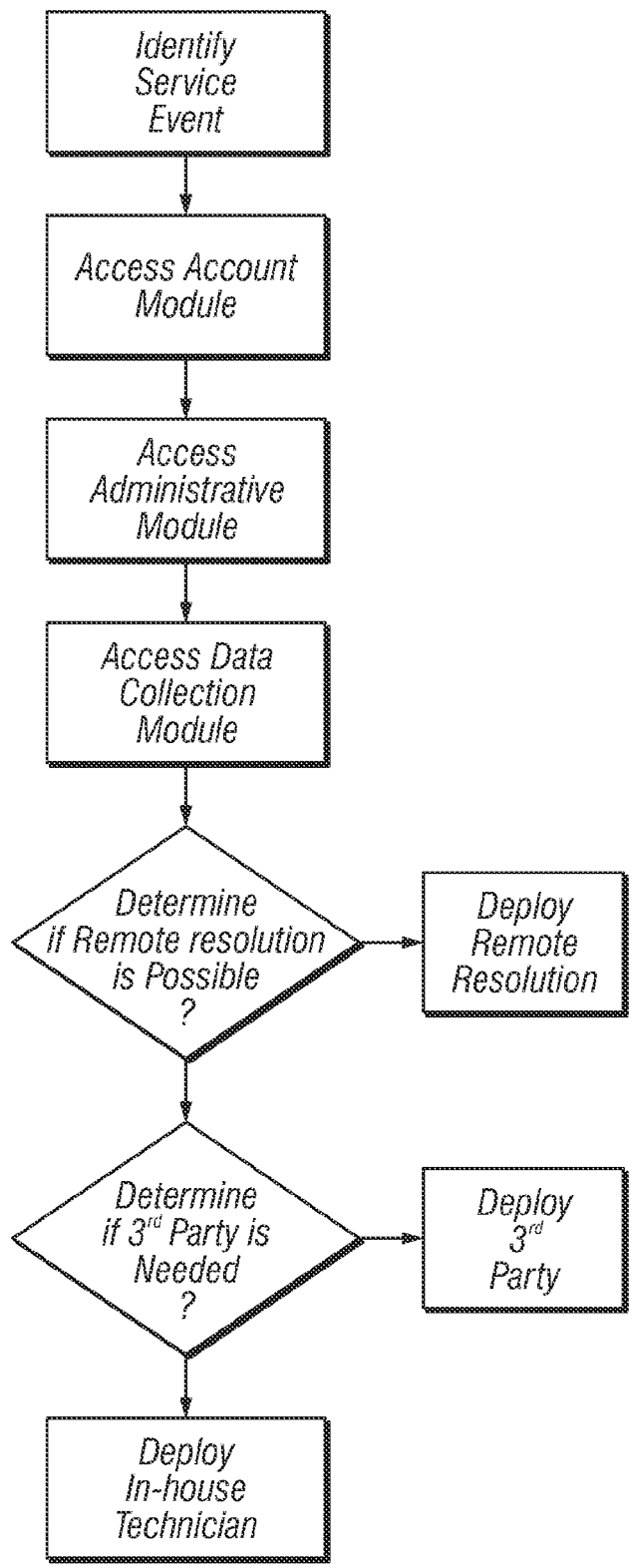
FIG. 5 is a flow diagram that illustrates a service event according to the invention.

FIG. 5 is a flow diagram that illustrates a service event according to the invention.

In FIG. 5, a service event is identified (500) and the account module, administrative module, and data collection module are each accessed (501, 502, 503). A determination is made if remote resolution is possible (504) and, if so, remote resolution is deployed (505); if not, a determination is made if a third party is needed (506). If so, the third party is deployed (507); if not, an in-house technician is deployed (508).

Figure 6C:
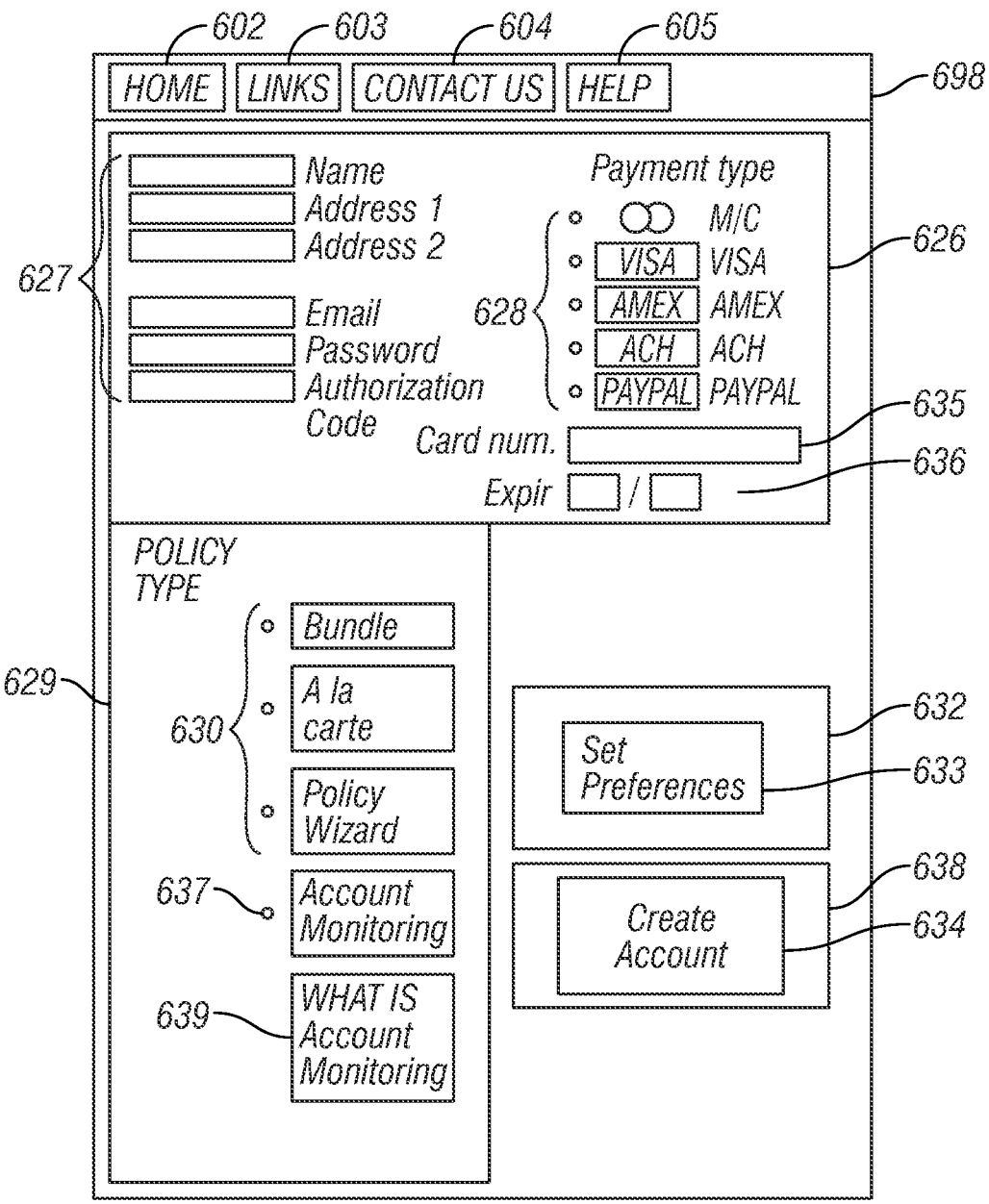

FIGS. 6A-6C are a series of screen shots that illustrate custodial accounts and user interaction therewith according to the invention.

In FIG. 6A, there is a Home button 602, Links button 603, Contact Us button 604, and a Help button 605, as is commonly found on many web sites. Uniquely, there is custodian window 601 that includes both an Existing Custodians pane 606 and a Become a Custodian pane 610. Existing custodians are presented with fields for their User Name 607 and Password 608, and may then select a Login button 609; while one desiring to become a custodian may select either a Create Account button 611 or a FAQ button 612. An important aspect of the invention is that of the data custodian, who is the keeper of the all important encryption key or the keeper of accessible copies of data collected by the invention. As discussed previously in this disclosure, it may be important for the data not to be accessible to any employee, officer, stakeholder, etc. of the organization whose servers are the subject of the data collection activities of the invention. The custodian needs a special account, separate from the client account. In most cases, with the possible exceptions of court orders, government intelligence service requests and the like, the client must authorize the custodian. Hence, the addition of the custodian authorization code 342 (FIG. 3C) before the custodian may setup a custodial account, have access, and request analysis, monitoring, data recovery, or other services. While a custodian may be an employee or stakeholder of the client organization, in a preferred embodiment the custodian is a third party, such as an auditor, CPA, client, supplier, court appointed monitor, government, law enforcement, and the like.

In FIG. 6B, the custodian is presented with a pane for changing account details 614 that includes a Correspondence Info field 615, Billing Info filed 616, and an Account Prefs field 617. The custodian is also presented with a Report System Changes pane 618 that includes a Self Report button 619; an Identify Service Need/Submit Claim pane 620 that includes an Identify Service Need field 699, Report Emergency field 621, Report Claim field 622, and a Live Chat field 623; and a ticket pane 689 that includes a Pending Tickets field 640 and a Past Tickets field 641.

In FIG. 6C, there is a payment pane 626 that includes user information fields 627 a payment type selection 628, a credit card number field 635, and a credit card expiration date field 636. There are also panes for selecting a policy type 629, which includes policy type selection buttons 630, an account monitoring button 637, and a What Is Account Monitoring button 639; setting preferences 632, including a Set Preferences button 633; and creating an account 638, including a Create Account button 634.

Figure 7:
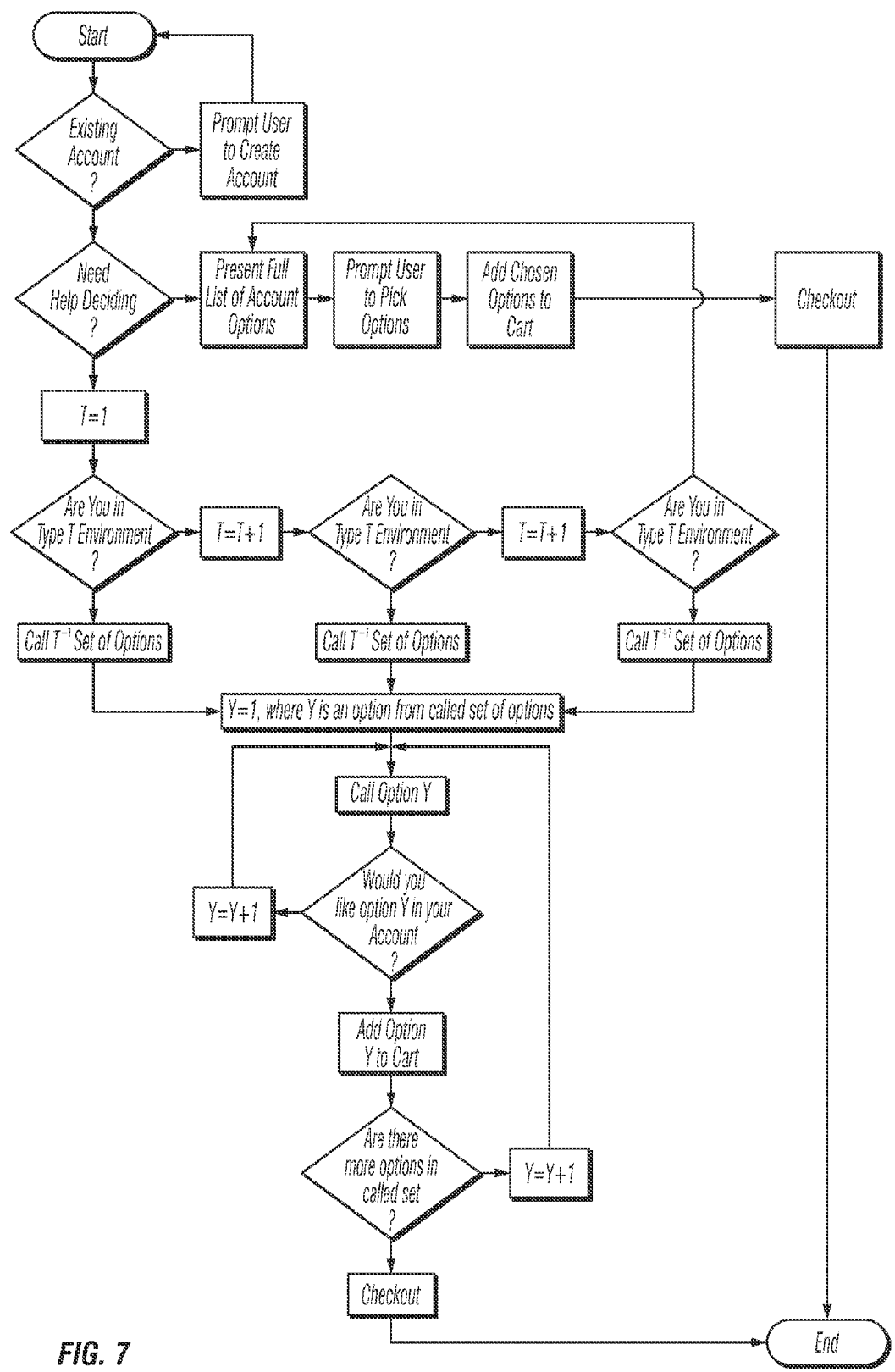
FIG. 7 is a flow diagram that illustrates user interaction with the user interface of FIGS. 6A-6C according to the invention.

FIG. 7 is a flow diagram that illustrates user interaction for authorized custodians with the user interface of FIGS. 6A-6C according to the invention.

In FIG. 7, the flow starts (700) with a determination if there is an existing account (701). If not, the user is prompted to create an account (702). If there is an account, a determination is made if the user needs helps (703). If he does not need such help, then a list of account options is presented (704) and the user is prompted to make a selection (705), after which the chosen options are added to a user cart (706) and the user proceeds to checkout (707), after which the session is complete (708). If the user does need help deciding on an account type, for example based on a time out T=1 (709), then the user is asked if he is in a Type T environment (710). If the answer is "Yes," then the T set of options is called (715). User selection of an option (718) calls the selected option (719). If the user is asked if he is in a Type T environment and there is a time out T=T+1 (711), then the user is again asked if he is in a Type T environment (712) and, if the user answers "Yes," then the T set of options is called (716) and the process proceeds. If there is a further time out (713), the user is again asked if he is in a Type T environment (714) and the process responds to the user's entry of an answer by calling the T options set (717) or the process responds to a further time out by again presenting a list of options to the user (704).

When an option Y is selected, the option is called (719) and the user is asked if he would like option Y in his account (721). If the answer is "Yes," the option is added to the user's cart (722); if there is a time out Y=Y+1 (720) the option is called again. If the option is added to the user's cart, the user is asked if there are more options to be set (723). If there is a time out Y=Y+1 (724), then the option is called again (719); else, the user checks out (725) and the process is concluded (708).

Figure 8:
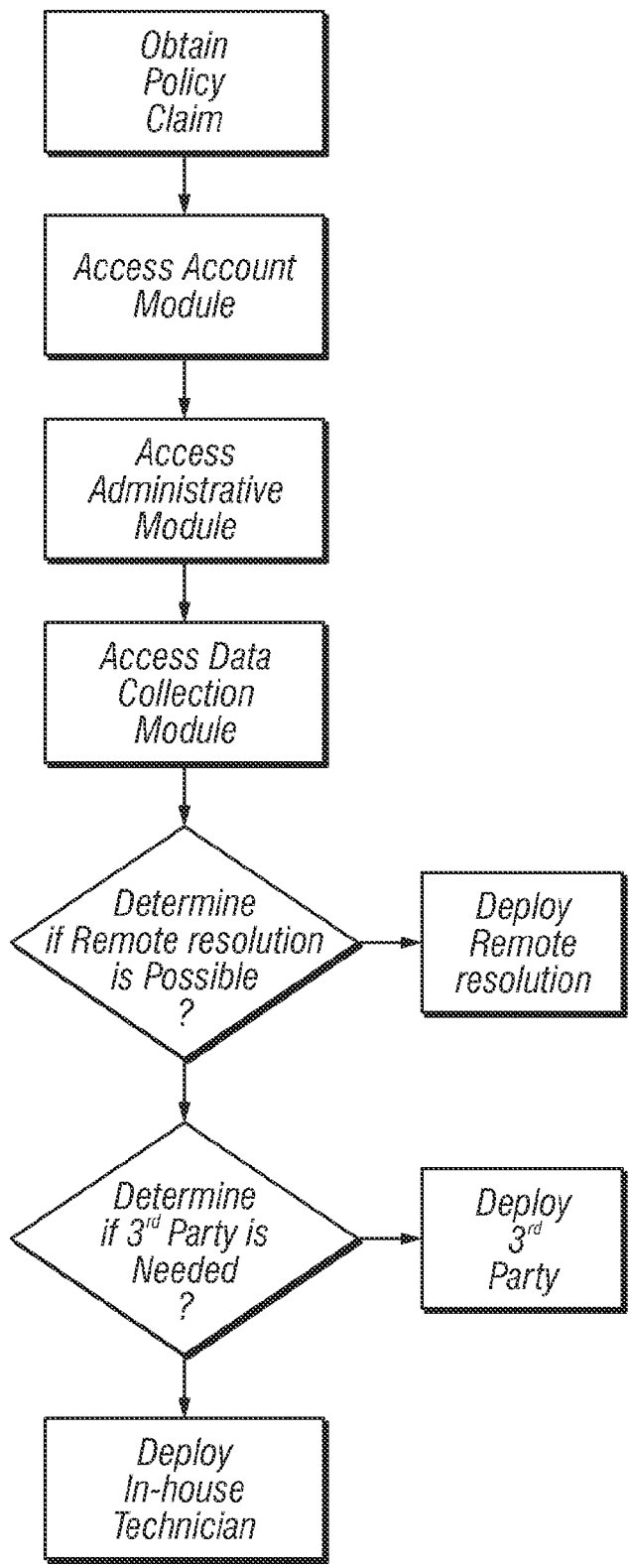
FIG. 8 is a flow diagram that illustrates a policy claim according to the invention.

FIG. 8 is a flow diagram that illustrates a policy claim according to the invention.

In FIG. 8, a service event is identified (800) and the account module, administrative module, and data collection module are each accessed (801, 802, 803). A determination is made if remote resolution is possible (804) and, if so, remote resolution is deployed (805); if not, a determination is made if a third party is needed (806). If so, the third party is deployed (807); if not, an in-house technician is deployed (808).

Other Unique Material and Additional Information

Visible and Credible Deterrent to Fraud

To be effective, a fraud deterrent (in fact, any deterrent to crime) must be both visible and credible. In general, cops on the street deter crime while detectives don't deter much crime because detectives solve crimes that have already been committed.

To date, in the anti-fraud market space, products and services have been largely focused on detection. The prevailing belief in the anti-fraud profession is that good detection results in prevention. This is largely wishful thinking as any cop would argue. A recent book published in 2009 by John Wiley and Sons is entitled *Computer-Aided Fraud, Preven-*

*tion and Detection*. The book, by author David Coderre, ironically addresses detection methods and examples throughout the entire book. Even though the word "prevention" is listed first in the title, prevention is hardly mentioned throughout the text. The anti-fraud business is simply not focused today on prevention. A goal of the invention is to change this one-sided approach to the benefit of organizations, their employees, otherwise tempted fraudsters, stakeholders, governments, and society at large.

Visible

An embodiment of the invention publicizes the introduction of the anti-fraud system throughout the organization being monitored by the system. This includes all manner of effective methods to make the system visible to all employees of the organization. Presentation is a critical component in the method of fraud prevention. So there is a psychological component to the invention. Methods employed to this end may include:

Public meetings.
Text messages, logos, or splash screens displayed periodically on the computer monitors of employees within client organizations, such as daily at login or computer start.
Written description highlighted in an Employee Manual.
Check list item for mandatory new employee information transfer.
Mention to board of directors.
Mention to stockholders.
Mention to clients.
Mention to suppliers.
Mention to customers.
Mention to auditors.
Mention to bankers.
Mention to compliance or government oversight organizations.
Mention to insurance providers.
Mention to compliance oversight authorities.
Mention to constituents.
Mention to the press and community.

Special focus on training/information about the anti-fraud system is to be applied to the organization's accounting department, management, and the IT department because these departments are not uncommonly departments where fraudsters typically work or where a co-opted, bribed, or exploited accomplice typically work.

Sometimes a fraud accomplice may be an unknowing accomplice, i.e. a scapegoat. There is an element of the invention that protects employees. It is a fact that some fraudsters routinely cover their trail by purposefully making it look as if a fraud has been committed by a co-worker. For example, this may be done via the modification of digital records while using the login credentials of another. This information may have been obtained without the scapegoat's knowledge, such as examining post-it notes located near or under a potential scapegoat's computer keyboard. This can result in erroneous firings, prosecutions, and public disgrace. This aspect could be mentioned to employees with a message "this system is meant to protect you, protect our jobs, protect our company, and protect our clients and suppliers, stockholders and stakeholders."

An information technology system that is not under the supervision and control of the organization's IT service department or contractors is going to be noticed, especially by the client's IT Department, because IT departments are often not comfortable with IT systems they do not control. IT employees are not uncommonly implicated in fraud because they have the "keys to the data kingdom" within an organization.

IT employees may be bribed or become otherwise unwilling accomplices, sometimes giving in to temptation or coercion with surprisingly little effort on the part of the fraudster. The massive fraud perpetuated by the infamous fraudster Bernard Madoff was aided by two of Mr. Madoff's IT department employees who had maintenance and programming oversight of Mr. Madoff s fraudulent client asset reporting server system. Mr. Madoff paid them sums of money to go along with the fraud and not say anything to anyone. Of interest, the sums were extremely small compared to the magnitude of Mr. Madoff s take from the fraud. The invention could have prevented Mr. Madoff's fraud—one of the largest in history—and done so at what would have been a miniscule relative cost.

Color of the hardware components of the system. Bold or bright colors or unusual color combinations, unusual compared with other information technology systems, draw attention to the anti-fraud system. In computer rooms with glass partitions, the anti-fraud systems may easily be seen by passers by. A preferred embodiment color is red. This brings to mind associations with fire prevention systems, flashing red law enforcement lights, stop signs, and so called audit/compliance "red flag" rules.

Flashing light. The system may have a flashing light whose purpose is to catch the eye and remind people that the anti-fraud system is monitoring data. The preferred embodiment color of the light is red. This is similar to the red light on video cameras that signify they are recording and watching an area of an environment.

Posting or tag in a language. The anti-fraud hardware system may have a tag or sign in a language which announces its function. The language could be a written language common to the employees of the client organization or a sign language. The purpose of the posting would be to increase the security of the environment while drawing attention to the anti-fraud system.

A sound. The anti-fraud hardware system may incorporate a generator of a periodic or random sound. The sound may be such that it draws attention to itself without unduly disrupting the employees in the area being monitored. For example, the sound could be a short burst of compressed air being expelled.

Camera. A video or still camera may be part of the anti-fraud hardware system. This camera may be motion activated. Its purpose is to increase the security level of the environment local to the anti-fraud hardware while drawing attention to the anti-fraud systems.

Microphone. A microphone may be part of the anti-fraud hardware system. The microphone could be voice actuated. Its purpose is to increase the security level of the environment local to the anti-fraud hardware while drawing attention to the anti-fraud systems.

Lock. The anti-fraud system may be locked to the computer rack where the anti-fraud hardware is located. This is to prevent tampering and removal of the system and it provides a visual notice that this system is different and, hence, noticeable. Locks are uncommonly used today on individual hardware components to lock them in place.

Tamper proof screws. The anti-fraud hardware system may have tamper proof screws. These screws are to not only lower the risk of tampering, but to draw attention go the anti-fraud system and create a security aura associated with it.

Anti-movement monitor. The anti-fraud hardware system might have a module that notifies a monitoring control center if the anti-fraud hardware is moved from its location or turned in an attempt to compromise it. Further, a GPS component could be incorporated that would pinpoint where the system might have been moved to.

Tampering actuated ink sprayer. The anti-fraud hardware might be outfitted with an ink sprayer similar to the ink sprayers attached to fire alarms in many U.S. junior high schools to prevent teenagers from pulling the fire alarm for fun. If the physical hardware of the anti-fraud system is tampered with, indelible, visible dye, such as red ink, would be sprayed on the hands and body of the person doing the tampering. In another embodiment, the ink could be invisible, similar to the ink used to mark currency by banks being robbed. The ink may be only made visible by security personnel with special vision enhancement tools.

Aroma distributor. The anti-fraud hardware may be outfitted with an aroma distributor designed to make the system noticeable via human smell. The smell would remind a human in the area of the anti-fraud hardware that the hardware system is present. Any aroma type might suffice for this as long as it was not an aroma common to the environment in which the anti-fraud system was located. For example, the aroma might be of peat. As an example, rats are known to smell cat scent rubbed on things via secretions on the side of the cat's head. Cats commonly rub the sides of their faces on objects and, consequently, rats frequently stay clear of areas frequented by cats though otherwise tempted.

Credible

To be credible, the anti-fraud system must actually function as presented, must allow individuals, such as forensic accountants, to detect many types of fraud via historical data comparison analysis, and must demonstrate that it is a secure system.

Many types of fraud are perpetrated via changing digital data. For example, missing documents are often involved in fraud execution. Missing disbursement documents are a common example. As another example, modification of accounting data is commonly done to commit fraud. Fraudsters often remove some customer's accounts from the system and bill them directly from another location, such as the fraudster's home address. Data removal is extremely difficult to catch unless historical comparison analysis is possible. As another example, modification of database data is commonly done to commit fraud. As another example, more fraud is perpetrated via email than ever before. Removal of email records can hide a fraudster's steps. An anti-fraud system that preserves email records even if the email has been deleted by a user is something that would cause a potential fraudster to think twice.

Changing or removing digital data can be extremely difficult to notice after the fact unless historical data comparisons may be made. The invention makes this possible.

Additional credibility can be added via an ongoing program of data spot checks performed by an accredited audit service organization.

Other features that make the invention credible:

Encryption

Data is encrypted on the client's premises and stored in encrypted format. In one embodiment, no employees or officers of an organization have access to the encryption key. The encryption key is controlled by a Data Custodian. This Data Custodian may be authorized by the client, such as an Auditor or other third party service provider. Due to the encryption key, only the Data Custodian may access, review, or otherwise direct data analysis. A fraudster within an organization would have no ability to modify historical data when it is locked down with an encryption key.

Furthermore, the use of an encryption key that is not controlled by the organization being monitored underscores the vulnerability of traditional backup systems for fraud prevention. Backup systems are designed precisely to allow employees of an organization to view and recover historical data. This usage violates tenants of high data integrity, fraud or tampering prevention, or general credibility.

The option for the collected encrypted data to be copied off site to one or more secure data centers adds credibility. These data centers may be geographically remote. These data centers may mirror the data from one center to another. While a fraudster may be able to destroy on-site anti-fraud systems, such as by burning down the building where she works, the same fraudster would be hard pressed to find and identify off-site data and destroy them.

Hardware on Client Premises

The security of the anti-fraud on-site hardware itself adds to the credibility of the system. The possible use of color, flashing lights, signs, microphone, camera, lock, tamper proof screws, tamper proof ink sprayer, aroma, and sound generation lend credibility.

Data Copy/Sample/Snapshot Interval

The invention may have a data copy interval of a set period of time, set moments in time, or be randomly generated. A feature of the service offering may be to not reveal the interval methodology. Another feature may be to change the interval without notice. Another feature may be to change the interval on a random basis.

This data snapshot period of time may be compared to the interval that a searchlight sweeps around a prison. It is of value to prisoners wishing to execute a prison break to know the interval of the light sweep. If the light sweep timing is unknown and may additionally change timing on an unknown basis, the light has a greater deterrent effect on the crime of escaping from prison. The interval can be a set interval or dynamic interval and may be changed at any time.

Forensics Analysis System

An embodiment of the invention involves using the server virtualization capability of a hardware appliance to create a current or historical virtual environment. The invention uses the hardware appliances to be laboratory type systems for forensics analysis of historical data. Virtualizing an historical data/software environment that existed at a point in the past provides a unique and powerful tool for a forensic accountant to run reports and perform data analysis as the data existed at a point in the past.

This type of usage as a tool in fields such as forensic accounting is otherwise extremely difficult without the invention. The reason is that while an organization may have historical data backups, such as tape backups, the software and operating system environment at the point where data might be examined for fraud is often quite different from the historical software and operating system environment. Furthermore, it is often extremely difficult or impossible to recreate the historical environment. Software systems are updated all the time and it is often difficult and may even be impossible to roll back software versions to a previous time period so the data may be examined using the software versions and software configurations in use at the previous historical moment in time.

An embodiment of the invention uses a forensics analysis system at third party site locations for data analysis, for example, at a laboratory setup by an audit firm or at a crime laboratory. In some embodiments, the invention also uses a forensics analysis system at a client site location.

Servers Available to have Data Copied from them

An embodiment of the invention allows data to be copied from computer systems of all sorts to the data storage media in the anti-fraud system. The computer being monitored can be any data processing system with data storage. Known systems currently restrict the host computer to be one running a Microsoft, Linux, Unix, or Apple server operating system of certain versions. Therefore the invention allows data to be copied from any computing device with data storage regardless of its operating system.

Additionally, the invention allows data to be copied to an on-site server appliance with media storage capability. This computing device is not operating system dependent. Note: some systems use a Microsoft server Operating system for their appliances.

Adaptability

Another embodiment of the invention is to have an adaptable component that modifies fees charged or services rendered based on the monitoring of the client environment. This has utility for the setting of fees, anticipating the need for future storage requirements so the system does not stop taking snapshots of data due to insufficient storage capacity, and for potentially other uses.

Environment Monitoring

An environment may be monitored with components that focus on the use of the system as a fraud prevention system. For example, an embedded camera may record people who might try to tamper with the system, and send their photographs or video or the sound of their voices to a monitoring control center.

Scheduled Media Data Copy Delivery

A feature of utility in the invention is the option for a service program where "hard copy data snapshots," data from historical moments copied to storage media, may be shipped to a particular location on a schedule. For example, an entity such as an Audit firm monitoring another entity, such as a client, may desire hard media copies of data be delivered to a specific place once, once a month, once a quarter, once a year, and so on. This adds additional security of data. This allows the possibility of forensic analysis of more historical time periods than may be possible for a reasonable cost when using off-site secure, data storage centers for data retention.

Forensics Data Delivery, Analysis, and Related Services

The invention has an optional methodology where one or more service providers may provide data delivery services and other related consulting services. For example, a CPA audit firm may desire a service provider to deliver unencrypted data snapshots of a covered client environment to be delivered on a schedule to an audit firm for analysis. In another embodiment, a third party service entity may provide a laboratory environment with Forensics Analysis Systems and may further create virtual historical environments that may be used by forensic accountants or other forensics professionals for analysis. As another example, a court or government entity may monitor an organization and rely on third party service providers to provide data extraction and analysis.

Other Embodiments

The invention also has an embodiment where data is not stored locally but is moved directly, in encrypted or unencrypted form, from a client production computer to a secure, off-site location.

The invention described herein has utility in related areas of intellectual property (IP) development time stamping such as support for concept invention, support for legal matters such as discovery in defense of a lawsuit, support for compliance oversight, historical analysis, or other needs that could be satisfied via a secure and reliable source of historically accurate data and software applications that may be legitimately claimed to be indelible and include a secure custody component.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for maintaining high data integrity and for providing a secure audit for fraud prevention and detection, comprising:
   a client on-site server comprising a server processor executing instructions to perform the steps of:
   copying digital data that is stored on at least one client production server;
   storing said digital data in an encrypted format comprising an encryption key that is held by any of said client and a client backup/restore service provider;
   archiving discrete versions of computer folders by making multiple, sequential copies of said digital data on a predetermined time interval schedule that comprises any of a set, dynamic, and randomly variable interval;
   restoring from said data storage data that has been saved on at least one point in time on at least one client production server and that has been changed or deleted on said at least one client production server;
   a forensics analysis system comprising a forensics analysis processor executing instructions to perform the steps of:
   comparing putatively identical computer data stored on said data storage medium at different points in time to discover missing documents or documents with modification dates that have changed when there would otherwise have been no need to change them, wherein said putatively identical data comprises a plurality of discrete archival versions of said computer folders, each version containing documents as they existed at the point in time at which they were archived; and
   based upon said comparing, discovering fraud or searching for evidence after a fraud is suspected by identifying any of missing documents and documents with modification dates that have changed when there would otherwise have been no need to change them.

2. The apparatus of claim 1, said forensics analysis processor further executing instructions to perform the step of comparing differences in accounting system vendor invoice accounts at different points in time to identify any moving of fraudulent vendor transactions into a large group of legitimate transactions for a legitimate vendor.

3. The apparatus of claim 1, said forensics analysis processor further executing instructions to perform the step of comparing per period transaction totals for specific periods for legitimate vendors over historical time to identify suspicious activity.

4. The apparatus of claim 1, said forensics analysis processor further executing instructions to perform the step of comparing reports from at least two different periods, using exact data and software from said separate periods to identify suspicious activity.

5. The apparatus of claim 1, wherein said server is configured to replicate one or more of said client production servers via server virtualization.

6. The apparatus of claim 5, wherein a virtual client historical environment is compared with a client environment at different points in time; and wherein results of said comparison are reported.

7. The apparatus of claim 1, wherein said server and/or data thereon is mirrored at at least one off-site location.

8. The apparatus of claim 1, further comprising:
at least one mechanism for conspicuously publicizing said apparatus for maintaining high data integrity and for providing a secure audit for fraud prevention and detection.

9. The apparatus of claim 8, said mechanism for publicizing comprising any of:
public meetings;
written description highlighted in an employee manual;
check list item for mandatory new employee information transfer;
text messages, logos or splash screens displayed periodically on computer monitors of employees within monitored client organizations; and
mention to any of board of directors, stockholders, clients, suppliers, auditors, bankers, compliance or government oversight organizations, and insurance providers.

10. The apparatus of claim 8, said publicizing mechanism comprising any of:
color of the hardware components;
a flashing light;
a posting or tag in a language;
a periodic or random sound;
a camera;
a microphone;
a lock;
tamper proof screws;
a tampering actuated ink sprayer;
an aroma distributor; and
an anti-movement monitor.

11. The apparatus of claim 1, further comprising within a network comprising a medium of information exchange:
a plurality of data service centers;
a plurality of client environments;
a plurality of service providers;
a plurality of said hardware server appliances comprising a corresponding plurality of forensics analysis systems;
a network database; and
a fraud prevention and detection server.

12. The apparatus of claim 1, further comprising:
at least one server comprising a corresponding forensics analysis system configured to create a virtual historical environment and to perform fraud analysis in connection with fraud prevention and fraud detection.

13. The apparatus of claim 1, further comprising:
a forensics analysis system comprising:
an administration module;
a client account module;
a client environment determination module;
an automated data collection module;
a client fee calculation module;
a service deployment module;
a control module;
a custodian module; and
an auxiliary module.

14. The apparatus of claim 1, further comprising:
a client portal.

15. The apparatus of claim 14, said client portal providing for creation of and access by at least one custodian.

16. A method for maintaining high data integrity and for providing a secure audit for fraud prevention and detection, comprising the steps of:
providing a client on-site server comprising a server processor executing instructions to perform the steps of:
copying digital data that is stored on at least one client production server;
storing said digital data in an encrypted format comprising an encryption key that is held by any of said client and a client backup/restore service provider;
archiving discrete versions of computer folders by making multiple, sequential copies of said digital data on a predetermined time interval schedule that comprises any of a set, dynamic, and randomly variable interval;
restoring from said data storage data that has been saved on at least one point in time on at least one client production server and that has been changed or deleted on said at least one client production server;
providing a forensics analysis system comprising a forensics analysis processor executing instructions to perform the steps of:
comparing putatively identical computer data stored in said data storage medium at different points in time to discover missing documents or documents with modification dates that have changed when there would otherwise have been no need to change them, wherein said putatively identical data comprises a plurality of discrete archival versions of said computer folders, each version containing documents as they existed at the point in time at which they were archived; and
based upon said comparing, discovering fraud or searching for evidence after a fraud is suspected by identifying any of missing documents and documents with modification dates that have changed when there would otherwise have been no need to change them.

17. The method of claim 16, said publicizing mechanism comprising any of:
color of the hardware components;
a flashing light;
a posting or tag in a language;
a periodic or random sound;
a camera;
a microphone;
a lock;
tamper proof screws;
a tampering actuated ink sprayer;
an aroma distributor; and
an anti-movement monitor.

18. The method of claim 16, wherein said forensics analysis processor further executing instructions to perform the step of comparing differences in accounting system vendor invoice accounts at different points in time to identify any moving of fraudulent vendor transactions into a large group of legitimate transactions for a legitimate vendor.

19. The method of claim 16, wherein said forensics analysis processor further executing instructions to perform the step of comparing per period transaction totals for specific periods for legitimate vendors over historical time to identify suspicious activity.

20. The method of claim 16, wherein said forensics analysis processor further executing instructions to perform the step of comparing reports from at least two different periods, using exact data and software from said separate periods to identify suspicious activity.

21. The method of claim 16, said mechanism for publicizing comprising any of:
public meetings;
written description highlighted in an employee manual;
check list item for mandatory new employee information transfer;

text messages, logos or splash screens displayed periodically on computer monitors of employees within monitored client organizations; and mention to any of board of directors, stockholders, clients, suppliers, auditors, bankers, compliance or government oversight organizations, and insurance providers.

22. The method of claim 16, wherein said server is configured to replicate one or more of said client production servers via server virtualization.

23. The method of claim 16, further comprising the steps of:

comparing a virtual client historical environment with a client environment of said client on-site server at different points in time; and reporting results of said comparison.

* * * * *